(12) United States Patent
Rodriguez

(10) Patent No.: US 9,998,750 B2
(45) Date of Patent: Jun. 12, 2018

(54) SYSTEMS AND METHODS FOR GUIDED CONVERSION OF VIDEO FROM A FIRST TO A SECOND COMPRESSION FORMAT

(71) Applicant: Cisco Technology, Inc., San Jose, CA (US)

(72) Inventor: Arturo A. Rodriguez, Norcross, GA (US)

(73) Assignee: Cisco Technology, Inc., San Jose, CA (US)

( * ) Notice: Subject to any disclaimer, the term of this patent is extended or adjusted under 35 U.S.C. 154(b) by 626 days.

(21) Appl. No.: 13/843,454

(22) Filed: Mar. 15, 2013

(65) Prior Publication Data

US 2014/0269919 A1 Sep. 18, 2014

(51) Int. Cl.
*H04N 7/36* (2006.01)
*H04N 19/513* (2014.01)
*H04N 19/56* (2014.01)
*H04N 19/40* (2014.01)

(52) U.S. Cl.
CPC ........... *H04N 19/513* (2014.11); *H04N 19/40* (2014.11); *H04N 19/56* (2014.11)

(58) Field of Classification Search
CPC ....... H04N 19/513; H04N 19/40; H04N 19/56
USPC .................................................... 375/240.16
See application file for complete search history.

(56) References Cited

U.S. PATENT DOCUMENTS 4,216,504 A 8/1980 Boussina et al.
4,504,852 A 3/1985 Ducret
4,881,125 A 11/1989 Krause
(Continued)

FOREIGN PATENT DOCUMENTS

DE 198 10 814 A1 9/1999
EP 0 595 323 A2 5/1994
(Continued)

OTHER PUBLICATIONS

U.S. Final Office Action cited in U.S. Appl. No. 10/663,037 dated Dec. 10, 2008, 31 pgs.
(Continued)

*Primary Examiner* — Jorge L Ortiz Criado
*Assistant Examiner* — Stefan Gadomski
(74) *Attorney, Agent, or Firm* — Merchant & Gould P.C.

(57) ABSTRACT

Converting video information from a first compression format to a second compression format, including receiving data for a sequence of pictures in the first compression format, the received data including a video stream corresponding to a video program and including for a picture that is inter coded motion vectors and quantized transform coefficients of residuals of motion compensated inter-coded blocks. The converting also includes extracting auxiliary information including one or more auxiliary data elements from the received data; and transcoding from the first compression format to the second compression format, including carrying out motion estimation for blocks of image data in the second compression format. Carrying out motion estimation for blocks of image data in the second format includes using the auxiliary information to ascertain whether to use a first motion estimation method or a second motion estimation method different from the first motion estimation method.

20 Claims, 8 Drawing Sheets

(56) References Cited

U.S. PATENT DOCUMENTS

| | | |
|---|---|---|
| 4,953,020 A * | 8/1990 | De With .............. H04N 19/619 348/400.1 |
| 4,972,274 A | 11/1990 | Becker et al. |
| 5,113,455 A | 5/1992 | Scott |
| 5,121,205 A | 6/1992 | Ng et al. |
| 5,187,575 A | 2/1993 | Lim |
| 5,218,435 A | 6/1993 | Lim et al. |
| 5,262,854 A | 11/1993 | Ng |
| 5,278,647 A | 1/1994 | Hingorani |
| 5,329,309 A | 7/1994 | Dorricott et al. |
| 5,377,051 A | 12/1994 | Lane et al. |
| 5,400,053 A | 3/1995 | Johary et al. |
| 5,426,464 A | 6/1995 | Casavant et al. |
| 5,444,491 A | 8/1995 | Lim |
| 5,459,528 A | 10/1995 | Pettitt |
| 5,473,378 A | 12/1995 | Tamitani |
| 5,485,210 A | 1/1996 | Lim et al. |
| 5,561,463 A | 10/1996 | Thomas et al. |
| 5,561,467 A | 10/1996 | Takeuchi et al. |
| 5,565,996 A | 10/1996 | Ueda |
| 5,606,359 A | 2/1997 | Youden et al. |
| 5,614,952 A | 3/1997 | Boyce et al. |
| 5,646,693 A | 7/1997 | Cismas |
| 5,650,824 A | 7/1997 | Huang |
| 5,684,544 A | 11/1997 | Astle |
| 5,703,966 A | 12/1997 | Astle |
| 5,724,446 A | 3/1998 | Liu et al. |
| 5,742,829 A | 4/1998 | Davis et al. |
| 5,748,789 A | 5/1998 | Lee et al. |
| 5,764,992 A | 6/1998 | Kullick |
| 5,781,184 A | 7/1998 | Wasserman et al. |
| 5,812,787 A | 9/1998 | Astle |
| 5,828,370 A | 10/1998 | Moeller et al. |
| 5,835,145 A | 11/1998 | Ouyang et al. |
| 5,835,149 A | 11/1998 | Astle |
| 5,835,151 A | 11/1998 | Sun et al. |
| 5,836,003 A | 11/1998 | Sadeh |
| 5,841,480 A | 11/1998 | Rhodes |
| 5,844,615 A | 12/1998 | Nuber et al. |
| 5,844,620 A | 12/1998 | Coleman et al. |
| 5,864,371 A | 1/1999 | Nayebi |
| 5,929,911 A | 7/1999 | Cheney et al. |
| 5,930,386 A * | 7/1999 | Saito ..................... H04N 1/642 375/E7.088 |
| 5,930,445 A | 7/1999 | Peters et al. |
| 5,953,506 A | 9/1999 | Kalra et al. |
| 5,956,026 A | 9/1999 | Ratakonda |
| 5,959,684 A | 9/1999 | Tan et al. |
| 5,973,740 A | 10/1999 | Hrusecky |
| 5,982,360 A | 11/1999 | Wu et al. |
| 5,995,095 A | 11/1999 | Ratakonda |
| 6,006,034 A | 12/1999 | Heath et al. |
| 6,009,231 A | 12/1999 | Aoki et al. |
| 6,043,838 A | 3/2000 | Chen |
| 6,072,531 A | 6/2000 | Shibano |
| 6,072,532 A | 6/2000 | Chieh et al. |
| 6,084,908 A | 7/2000 | Chiang et al. |
| 6,091,777 A | 7/2000 | Guetz et al. |
| 6,137,948 A | 10/2000 | Moon et al. |
| 6,141,447 A * | 10/2000 | Linzer et al. ................ 382/236 |
| 6,148,027 A | 11/2000 | Song et al. |
| 6,157,396 A | 12/2000 | Margulis et al. |
| 6,195,390 B1 | 2/2001 | Hashino et al. |
| 6,201,927 B1 | 3/2001 | Comer |
| 6,208,692 B1 | 3/2001 | Song et al. |
| 6,222,979 B1 | 4/2001 | Willis et al. |
| 6,233,253 B1 | 5/2001 | Settle et al. |
| 6,233,277 B1 | 5/2001 | Özcelik et al. |
| 6,249,549 B1 | 6/2001 | Kim |
| 6,259,741 B1 | 7/2001 | Chen et al. |
| 6,295,321 B1 | 9/2001 | Lyu |
| 6,297,801 B1 | 10/2001 | Jiang |
| 6,326,964 B1 | 12/2001 | Snyder et al. |
| 6,353,633 B1 | 3/2002 | Her |
| 6,360,015 B1 | 3/2002 | Bakhmutsky et al. |
| 6,400,764 B1 | 6/2002 | Bakhmutsky |
| 6,408,101 B1 | 6/2002 | Krishnamurthy et al. |
| 6,414,991 B1 | 7/2002 | Yagasaki et al. |
| 6,430,317 B1 | 8/2002 | Krishnamurthy et al. |
| 6,434,196 B1 | 8/2002 | Sethuraman et al. |
| 6,434,197 B1 | 8/2002 | Wang et al. |
| 6,438,168 B2 | 8/2002 | Arye |
| 6,441,754 B1 | 8/2002 | Wang et al. |
| 6,477,562 B2 | 11/2002 | Nemirovsky et al. |
| 6,529,244 B1 | 3/2003 | Hrusecky |
| 6,532,593 B1 | 3/2003 | Moroney |
| 6,535,559 B2 | 3/2003 | Yagasaki et al. |
| 6,556,714 B2 | 4/2003 | Kato |
| 6,560,371 B1 | 5/2003 | Song et al. |
| 6,570,579 B1 | 5/2003 | MacInnis et al. |
| 6,577,352 B1 | 6/2003 | Park et al. |
| 6,594,439 B2 | 7/2003 | Imahashi et al. |
| 6,608,625 B1 | 8/2003 | Chin et al. |
| 6,608,935 B2 | 8/2003 | Nagumo et al. |
| 6,618,507 B1 | 9/2003 | Divakaran et al. |
| 6,643,328 B2 | 11/2003 | Yagasaki et al. |
| 6,647,061 B1 * | 11/2003 | Panusopone ... H04N 21/234309 375/240.12 |
| 6,654,539 B1 | 11/2003 | Druoz et al. |
| 6,658,157 B1 | 12/2003 | Satoh et al. |
| 6,658,199 B1 | 12/2003 | Hallberg |
| 6,671,322 B2 | 12/2003 | Vetro et al. |
| 6,671,454 B1 | 12/2003 | Kaneko et al. |
| 6,674,479 B2 | 1/2004 | Cook et al. |
| 6,675,387 B1 | 1/2004 | Boucher et al. |
| 6,690,881 B1 | 2/2004 | Tomita et al. |
| 6,700,622 B2 | 3/2004 | Adams et al. |
| 6,707,937 B1 | 3/2004 | Sobel et al. |
| 6,714,594 B2 | 3/2004 | Dimitrova |
| 6,735,253 B1 | 5/2004 | Chang et al. |
| 6,744,816 B1 | 6/2004 | Park et al. |
| 6,747,661 B1 | 6/2004 | Peterson |
| 6,766,407 B1 | 7/2004 | Lisitsa et al. |
| 6,768,774 B1 | 7/2004 | MacInnis et al. |
| 6,847,778 B1 | 1/2005 | Vallone et al. |
| 6,871,003 B1 | 3/2005 | Phillips et al. |
| 6,876,703 B2 | 4/2005 | Ismaeil et al. |
| 6,909,749 B2 | 6/2005 | Yang et al. |
| 6,931,064 B2 | 8/2005 | Mori et al. |
| 6,996,838 B2 | 2/2006 | Rodriguez |
| 7,006,147 B2 | 2/2006 | Willis |
| 7,010,040 B2 | 3/2006 | Kim |
| 7,027,713 B1 | 4/2006 | Hallberg |
| 7,035,337 B2 | 4/2006 | Sugiyama et al. |
| 7,050,499 B2 | 5/2006 | Kodama et al. |
| 7,072,568 B2 | 7/2006 | Sugiyama et al. |
| 7,079,578 B2 | 7/2006 | Segev |
| 7,133,452 B1 * | 11/2006 | Rault ....................... 375/240.16 |
| 7,136,417 B2 | 11/2006 | Rodriguez |
| 7,154,560 B1 | 12/2006 | Chang et al. |
| 7,233,622 B2 | 6/2007 | Winger et al. |
| 7,274,857 B2 | 9/2007 | Nallur et al. |
| 7,302,002 B2 | 11/2007 | Yagasaki et al. |
| 7,324,595 B2 | 1/2008 | Cote et al. |
| 7,327,786 B2 | 2/2008 | Winger et al. |
| 7,356,082 B1 | 4/2008 | Kuhn |
| 7,391,809 B2 | 6/2008 | Li et al. |
| 7,414,632 B1 | 8/2008 | Piazza et al. |
| 7,418,037 B1 | 8/2008 | Nie et al. |
| 7,477,833 B2 | 1/2009 | Kato et al. |
| 7,869,505 B2 | 1/2011 | Rodriguez et al. |
| 7,933,339 B2 | 4/2011 | Rodriguez |
| 7,957,470 B2 | 6/2011 | Rodriguez et al. |
| 7,966,642 B2 | 6/2011 | Nair et al. |
| 7,995,649 B2 * | 8/2011 | Zuo ....................... H04N 19/176 375/240.01 |
| 8,130,828 B2 * | 3/2012 | Hsu ....................... H04N 19/126 348/27 |
| 8,189,933 B2 * | 5/2012 | Holcomb ............. H04N 19/176 382/232 |
| 8,223,848 B2 | 7/2012 | Rodriguez et al. |
| 8,300,696 B2 | 10/2012 | Liang et al. |
| 8,301,016 B2 | 10/2012 | Rodriguez et al. |
| 8,358,916 B2 | 1/2013 | Rodriguez et al. |

(56) References Cited

U.S. PATENT DOCUMENTS

| | | |
|---|---|---|
| 8,429,699 B2 | 4/2013 | Rodriguez et al. |
| 8,442,124 B2 | 5/2013 | Rodriguez |
| 8,600,217 B2 | 12/2013 | Rodriguez et al. |
| 9,516,311 B2 | 12/2016 | Rodriguez |
| 2001/0014206 A1 | 8/2001 | Artigalas et al. |
| 2002/0009149 A1 | 1/2002 | Rodriguez et al. |
| 2002/0039483 A1 | 4/2002 | Frost et al. |
| 2002/0044762 A1 | 4/2002 | Wood et al. |
| 2002/0071663 A1 | 6/2002 | O'Donnel |
| 2002/0080268 A1 | 6/2002 | Willis |
| 2002/0133828 A1 | 9/2002 | Foster |
| 2002/0150044 A1* | 10/2002 | Wu .................. H04L 12/5695 370/229 |
| 2002/0157112 A1 | 10/2002 | Kuhn |
| 2002/0199199 A1 | 12/2002 | Rodriguez |
| 2003/0001964 A1 | 1/2003 | Masukura et al. |
| 2003/0053711 A1* | 3/2003 | Kim .................. H04N 19/86 382/268 |
| 2003/0066084 A1 | 4/2003 | Kaars |
| 2003/0078061 A1 | 4/2003 | Kim |
| 2003/0093800 A1 | 5/2003 | Demas et al. |
| 2003/0098924 A1 | 5/2003 | Adams et al. |
| 2003/0099290 A1* | 5/2003 | Chen .................. H04N 19/172 375/240.03 |
| 2003/0103604 A1 | 6/2003 | Kato et al. |
| 2003/0108099 A1 | 6/2003 | Nagumo |
| 2003/0113098 A1 | 6/2003 | Willis |
| 2003/0123849 A1 | 7/2003 | Nallur et al. |
| 2003/0147631 A1 | 8/2003 | Zimmerman |
| 2003/0170003 A1 | 9/2003 | Levesque et al. |
| 2003/0229900 A1* | 12/2003 | Reisman .................. 725/87 |
| 2003/0233663 A1 | 12/2003 | Rao et al. |
| 2004/0008790 A1 | 1/2004 | Rodriguez |
| 2004/0047416 A1* | 3/2004 | Tomita .................. H04N 5/21 375/240.2 |
| 2004/0055020 A1 | 3/2004 | Delpuch |
| 2004/0062313 A1 | 4/2004 | Schoenblum |
| 2004/0101055 A1* | 5/2004 | Hourunranta .......... H04N 19/89 375/240.24 |
| 2004/0194134 A1 | 9/2004 | Gunatilake et al. |
| 2004/0218680 A1 | 11/2004 | Rodriguez et al. |
| 2005/0002569 A1* | 1/2005 | Bober .................. G06T 7/206 382/191 |
| 2005/0022245 A1 | 1/2005 | Nallur et al. |
| 2005/0074062 A1* | 4/2005 | Sung .................. H04N 19/176 375/240.2 |
| 2005/0074063 A1 | 4/2005 | Nair et al. |
| 2006/0013568 A1 | 1/2006 | Rodriguez |
| 2006/0093227 A1* | 5/2006 | Bourge .................. H04N 19/176 382/236 |
| 2006/0093320 A1 | 5/2006 | Hallberg et al. |
| 2006/0103660 A1 | 5/2006 | Maynard et al. |
| 2006/0106959 A1 | 5/2006 | Plourde, Jr. |
| 2006/0177141 A1* | 8/2006 | Montminy .......... H04N 9/8042 382/236 |
| 2006/0182275 A1* | 8/2006 | Nicolai .................. H04N 7/1675 380/37 |
| 2007/0009048 A1 | 1/2007 | Rodriguez |
| 2007/0030904 A1* | 2/2007 | Winger et al. ............ 375/240.16 |
| 2007/0058718 A1* | 3/2007 | Shen et al. ................ 375/240.12 |
| 2007/0094583 A1* | 4/2007 | Randall et al. ............ 715/500.1 |
| 2007/0153918 A1 | 7/2007 | Rodriguez |
| 2007/0250893 A1* | 10/2007 | Akiyama .............. H04N 5/208 725/131 |
| 2007/0286286 A1* | 12/2007 | Heng et al. ............... 375/240.16 |
| 2007/0286581 A1 | 12/2007 | Boston et al. |
| 2008/0031337 A1 | 2/2008 | Hasegawa et al. |
| 2008/0037952 A1 | 2/2008 | Nallur et al. |
| 2008/0037957 A1 | 2/2008 | Nallur et al. |
| 2008/0181578 A1* | 7/2008 | Hanes ........................... 386/124 |
| 2008/0240093 A1 | 10/2008 | Morad et al. |
| 2008/0253464 A1 | 10/2008 | Rodriguez et al. |
| 2008/0260024 A1 | 10/2008 | Chen et al. |
| 2008/0279284 A1 | 11/2008 | Rodriguez et al. |
| 2009/0002529 A1* | 1/2009 | Shurboff ............ H04N 5/23232 348/251 |
| 2009/0033791 A1 | 2/2009 | Rodriguez et al. |
| 2009/0116554 A1* | 5/2009 | Ma et al. .................. 375/240.16 |
| 2009/0180532 A1* | 7/2009 | Zhang .................. H04N 19/139 375/240.01 |
| 2009/0245587 A1* | 10/2009 | Holcomb ............ H04N 19/176 382/108 |
| 2010/0020878 A1 | 1/2010 | Liang |
| 2010/0074326 A1* | 3/2010 | Sathianathan ............ 375/240.03 |
| 2011/0013692 A1* | 1/2011 | Cohen et al. ............. 375/240.02 |
| 2011/0289128 A1* | 11/2011 | Star Sung .............. G06F 17/147 708/210 |
| 2013/0251047 A1 | 9/2013 | Rodriguez |
| 2014/0119432 A1* | 5/2014 | Wang ................ H04N 19/00078 375/240.2 |
| 2014/0130083 A1* | 5/2014 | Robinson ....... H04N 21/440263 725/31 |
| 2014/0133573 A1* | 5/2014 | Hsu ........................ 375/240.18 |
| 2014/0140396 A1* | 5/2014 | Wang .................... H04N 19/61 375/240.03 |

FOREIGN PATENT DOCUMENTS

| | | |
|---|---|---|
| EP | 0 812 112 A2 | 12/1997 |
| EP | 1 026 899 A1 | 8/2000 |
| EP | 1 161 089 A2 | 12/2001 |
| EP | 1 195 995 A2 | 4/2002 |
| JP | 05-49000 | 2/1993 |
| JP | 10-243344 | 10/1998 |
| JP | 10-271498 | 10/1998 |
| JP | 11-18063 | 1/1999 |
| JP | 11-196411 | 7/1999 |
| JP | 02-500851 | 1/2002 |
| JP | 03-087785 | 3/2003 |
| JP | 03-102008 | 4/2003 |
| WO | 96/10889 | 4/1996 |
| WO | 97/15149 | 4/1997 |
| WO | 99/12097 | 3/1999 |
| WO | 99/14940 | 3/1999 |
| WO | 99/22517 | 5/1999 |
| WO | 99/59343 A | 11/1999 |
| WO | 01/13625 A1 | 2/2001 |
| WO | 02-43385 A2 | 5/2002 |

OTHER PUBLICATIONS

U.S. Non-Final Office Action cited in U.S. Appl. No. 10/854,874 dated Dec. 15, 2008, 9 pgs.

U.S. Non-Final Office Action cited in U.S. Appl. No. 09/736,661 dated Mar. 3, 2009, 5 pgs.

U.S. Non-Final Office Action cited in U.S. Appl. No. 10/891,318 dated Mar. 19, 2009, 27 pgs.

U.S. Non-Final Office Action cited in U.S. Appl. No. 10/663,037 dated May 14, 2009, 21 pgs.

U.S. Final Office Action cited in U.S. Appl. No. 10/854,874 dated Jun. 11, 2009, 8 pgs.

U.S. Non-Final Office Action cited in U.S. Appl. No. 09/736,661 dated Sep. 16, 2009, 13 pgs.

U.S. Final Office Action cited in U.S. Appl. No. 10/663,037 dated Nov. 24, 2009, 43 pgs.

U.S. Final Office Action cited in U.S. Appl. No. 10/891,318 dated Dec. 1, 2009, 29 pgs.

U.S. Final Office Action cited in U.S. Appl. No. 09/736,661 dated Mar. 9, 2010, 20 pgs.

U.S. Non-Final Office Action cited in U.S. Appl. No. 10/891,318 dated Mar. 15, 2011, 16 pgs.

U.S. Final Office Action dated Aug. 1, 2011 in U.S. Appl. No. 10/891,318, 20 pages.

U.S. Non-Final Office Action dated Aug. 22, 2011 in U.S. Appl. No. 12/177,916, 35 pages.

U.S. Non-Final Office Action dated Sep. 16, 2011 in U.S. Appl. No. 12/180,501, 29 pages.

U.S. Non-Final Office Action dated Oct. 11, 2011 in U.S. Appl. No. 11/831,928, 11 pages.

(56) References Cited

OTHER PUBLICATIONS

U.S. Final Office Action dated Jan. 13, 2012 in U.S. Appl. No. 12/177,916, 7 pages.
U.S. Final Office Action dated Mar. 5, 2012 in U.S. Appl. No. 12/180,501, 9 pages.
U.S. Non-Final Office Action dated Mar. 29, 2012 in U.S. Appl. No. 11/832,391, 25 pages.
U.S. Non-Final Office Action dated Apr. 10, 2012 in U.S. Appl. No. 11/843,711, 22 pages.
U.S. Final Office Action dated May 22, 2012 in U.S. Appl. No. 11/831,928, 12 pages.
U.S. Non-Final Office Action dated Oct. 10, 2012 in U.S. Appl. No. 11/831,928, 39, pages.
U.S. Non-Final Office Action dated Mar. 22, 2013 in U.S. Appl. No. 10/891,318, 22 pages.
U.S. Final Office Action dated May 1, 2013 in U.S. Appl. No. 11/831,928, 14 pages.
U.S. Final Office Action dated Sep. 23, 2013 in U.S. Appl. No. 11/831,928, 19 pages.
U.S. Non-Final Office Action dated Apr. 3, 2014 in U.S. Appl. No. 11/831,928, 20 pages.
U.S. Non-Final Office Action dated Nov. 26, 2014, 2014 in U.S. Appl. No. 11/831,928, 19 pgs.
Richardson, I. et al., "Video codec complexity management," Proc. International Picture Coding Symposium (PCS01), Seoul, Korea, 4 pages (Apr. 2001).
Simonson et al., "Version augmented URIs for reference permanencevia an Apache module design," Computer Networks and ISDN Systems, North Holland Publishing, Amsterdam, NL, vol. 30, Apr. 1-7, 1998, pp. 337-345.
Topiwala, P., "Status of the emerging ITU-T/H.264 | ISO/MPEG-4, Part 10 Video coding standard," Proceedings of SPIE, vol. 4790, pp. 261-277 (Jul. 8, 2002).
International Search Report cited in PCT/US00/33837 dated Mar. 1, 2001, 7 pgs.
Written Opinion cited in PCT/US00/33837 dated Dec. 27, 2001, 4 pgs.
International Search Report cited in PCT/US02/40828 dated Apr. 21, 2003, 4 pgs.
Written Opinion cited in PCT/US02/40828 dated Dec. 16, 2003, 4 pgs.
International Search Report and Written Opinion cited in PCT/US2004/030012 dated Dec. 27, 2004, 12 pgs.
International Search Report and Written Opinion cited in PCT/US2005/024706 dated Oct. 18, 2005, 13 pgs.
Japanese Office Action cited in 2001-546180 dated Mar. 30, 2007, 10 pgs.
Canadian Office Action cited in Application No. 2,472,244 dated Apr. 3, 2008, 3 pgs.
Japanese Office Action cited in 2001-546180 dated Jun. 9, 2008, 13 pgs.
International Search Report and Written Opinion cited in PCT/US2008/070856 dated Dec. 15, 2008, 12 pgs.
EP Communication Pursuant to Article 94(3) EPC cited in 02 794 331.5 dated Jan. 12, 2009, 4 pgs.
Canadian Office Action cited in Application No. 2,573,906 dated Apr. 1, 2009, 2 pgs.
EP Communication Pursuant to Article 94(3) EPC cited in 00 984 341.8 dated May 19, 2009, 8 pgs.
Japanese Final Office Action cited in 2001-546180 dated Jun. 18, 2009, 6 pgs.
Japanese Final Office Action cited in 2006-526399 dated Sep. 25, 2009, 10 pgs.
Canadian Office Action cited in Application No. 2,533,169 dated Dec. 11, 2009, 3 pgs.
EP Examination cited in 00 984 341.8 dated Dec. 14, 2009, 5 pgs.
International Preliminary Report on Patentability and Written Opinion cited in PCT/US2008/070856 dated Feb. 2, 2010, 8 pgs.
Canadian Office Action cited in Application No. 2,539,120 dated Mar. 9, 2010, 4 pgs.
EP Examination cited in 05 764 529.3 dated Jun. 18, 2010, 9 pgs.
Canadian Office Action cited in Application No. 2,573,906 dated Aug. 9, 2010, 4 pgs.
EP Examination cited in 08 150 948.1 dated Dec. 17, 2010, 9 pgs.
Canadian Office Action cited in Application No. 2,573,906 dated Apr. 7, 2011, 4 pgs.
European Communicated cited in Application No. 05 794 529.3 dated May 19, 2011, 5 pgs.
Canadian Office Action cited in Application No. 2,539,120 dated Jun. 2, 2011, 3 pages.
European Search Report dated Aug. 1, 2011 in Application 11166809.1, 7 pages.
European Communication dated Aug. 5, 2011 in Application No. 08 796 477.1, 11 pages.
European Summons to attend oral proceedings dated Nov. 11, 2011 in Application No. 04757143.5, 5 pages.
European Communicated cited in Application No. 05 794 529.3 dated Feb. 27, 2012, 3 pgs.
Canadian Office Action dated Feb. 17, 2012 in Application No. 2,539,120, 4 pages.
Canadian Office Action dated Mar. 9, 2012 in Application No. 2,573,906, 6 pages.
European Communication dated Apr. 3, 2012 in Application No. 11 166 809.1, 5 pages.
European Communication dated Apr. 27, 2012 in Application No. 04788743.5, 6 pages.
European Communication dated Dec. 10, 2012 in Application No. 11 166 809.1, 4 pgs.
U.S. Non-Final Office Action cited in U.S. Appl. No. 09/736,661 dated Aug. 24, 2001, 9 pgs.
U.S. Final Office Action cited in U.S. Appl. No. 09/736,661 dated Apr. 10, 2002, 11 pgs.
U.S. Non-Final Office Action cited in U.S. Appl. No. 09/736,661 dated Mar. 26, 2003, 12 pgs.
U.S. Non-Final Office Action cited in U.S. Appl. No. 09/736,661 dated Oct. 20, 2003, 12 pgs.
U.S. Non-Final Office Action cited in U.S. Appl. No. 09/736,661 dated Jul. 19, 2004, 6 pgs.
U.S. Final Office Action cited in U.S. Appl. No. 09/736,661 dated Sep. 22, 2005, 8 pgs.
U.S. Non-Final Office Action cited in U.S. Appl. No. 09/736,661 dated Jul. 17, 2006, 10 pgs.
U.S. Final Office Action cited in U.S. Appl. No. 09/736,661 dated Jan. 3, 2007, 7 pgs.
U.S. Non-Final Office Action cited in U.S. Appl. No. 09/736,661 dated Sep. 11, 2007, 10 pgs.
U.S. Non-Final Office Action cited in U.S. Appl. No. 10/663,037 dated Dec. 10, 2007, 26 pgs.
U.S. Non-Final Office Action cited in U.S. Appl. No. 10/623,683 dated Dec. 28, 2007, 21 pgs.
U.S. Final Office Action cited in U.S. Appl. No. 09/736,661 dated Apr. 11, 2008, 13 pgs.
U.S. Non-Final Office Action cited in U.S. Appl. No. 10/854,874 dated May 13, 2008, 12 pgs.
U.S. Final Office Action cited in U.S. Appl. No. 10/623,683 dated Jul. 25, 2008, 18 pgs.
U.S. Non-Final Office Action cited in U.S. Appl. No. 10/663,037 dated Jun. 27, 2008, 24 pgs.
U.S. Non-Final Office Action cited in U.S. Appl. No. 09/736,661 dated Jul. 29, 2008, 14 pgs.
Draft ISO/IEC 14496-10: 2002 (E), Video Coding, Draft ITU-T Rec. H.264 (2002 E), pp. i-ix, 1-132.
Draft ITU-T Recommendation H.263, dated May 2, 1996, entitled "Line Transmission of Non-Telephone Signals; Video Coding for Low Bitrate Communication," pp. 1-57 (61 pgs).
ITU-T Recommendation H-262 entitled "Generic Coding of Moving Pictures and Associated Audio Information: Video," (ISO/IEC 13818-2: 1995 (E)) (211 pgs).
Joint Video Team (JVT) of ISO/IEC MPEG & ITU-T VCEG, (ISO/IEC JTC1/SC29/WG11 and ITU-T SG 16 Q.6), (JVT-D071), 4th Meeting: Klagenfurt, Austria, Jul. 22-26, 2002, entitled "Transmission of Auxiliary Chroma Information for Upsampling," by Arturo A. Rodriguez, pp. 1-5.

(56) References Cited

OTHER PUBLICATIONS

Wedi, "New Results on Adaptive Interpolation Filter," Joint Video Team (JVT) of ISO/IEC MPEG & ITU-T VCEG (ISO/IEC JTC1/SC29/WG11 and ITU-T SG16 Q.6), 2002, pp. 1-14.
Supplemental European Search Report in PCT/US0321945 dated Apr. 26, 2011 (3 pgs).
Written Opinion in PCT/US03/21945 dated Aug. 13, 2004 (5 pgs).
Preliminary Examination Report in PCT/US03/21945 dated Mar. 17, 2006 (4 pgs).
Canadian Office Action in Application No. 2,492,018 dated Aug. 13, 2009 (2 pgs).
Canadian Office Action in Application No. 2,492,018 dated Aug. 20, 2008 (3 pgs).
Non-Final Office Action in U.S. Appl. No. 11/532,415 dated Nov. 28, 2008 (10 pgs).
Non-Final Office Action in U.S. Appl. No. 11/532,415 dated Apr. 28, 2009 (8 pgs).
Non-final Office Action in U.S. Appl. No. 11/549,166 dated Sep. 17, 2010, (12 pgs).
Copending U.S. Appl. No. 13/893,954, filed May 14, 2013, by Rodriguez, entitled "Chroma Information Signaling for Video Streams".
"Information Technology—Generic Coding of Moving Pictures and Associated Audo Information: Video"; ITU-T Recommendation H.262 (Jul. 1995); ITU-T Standard Superseded (S), International Telecommunication Union, Geneva, Ch, No. H.262; Jul. 10, 1995; pp. 11-63.
EP Communication dated Jan. 8, 2013 in Appln No. 03 765 566.9, 5 pgs.
Office Action dated May 9, 2005, in U.S. Appl. No. 10/266,825, 12 pgs.
Office Action dated Sep. 27, 2005, in U.S. Appl. No. 10/266,825, 12 pgs.
Office Action dated May 16, 2006, in U.S. Appl. No. 10/266,825, 15 pgs.
Office Action dated Jul. 27, 2012, in U.S. Appl. No. 11/532,415, 10 pgs.
U.S. Final Office Action dated Feb. 24, 2016 cited in U.S. Appl. No. 13/893,954, 17 pgs.
JVT: "Text of Joint FCD for Joint Video Specification"; No. JVT-D157, Jul. 22-26, 2002; 207 pgs.
EP Communication dated Nov. 5, 2015 in Appln No. 03 765 566.9, 6 pgs.
Office Action dated Oct. 26, 2015, in U.S. Appl. No. 13/893,954, 28 pgs.
European Office Action dated Jan. 18, 2017 cited in Application No. 3765566.9, 7 pgs.

* cited by examiner

SYSTEMS AND METHODS FOR GUIDED CONVERSION OF VIDEO FROM A FIRST TO A SECOND COMPRESSION FORMAT

CROSS-REFERENCE TO RELATED APPLICATION

This application is related to U.S. patent applications Ser. No. 10/266,825, filed Oct. 8, 2002, and Ser. No. 10/663,037, filed Sep. 15, 2003, which are entirely incorporated herein by reference.

TECHNICAL FIELD

The disclosure is directed to encoding sequences of digital pictures, generally known as digital video compression, and more specifically concerns coding a sequence of digital pictures that was previously compressed.

BACKGROUND

Video compression methods reduce the bandwidth or storage requirements of digital video signals in applications such as High Definition (HD) television, video conferencing, video-on-demand, and multimedia communications. It is desirable to increase the amount of compression in digital video over established video compression formats without imposing unnecessary processing burden in the digital video compression while simultaneously preserving picture fidelity. Superior video compression performance is desirable for any of several technical and/or cost reasons, such as the reduction of bandwidth consumption in a transmission channel and/or the reduction of storage consumption.

The advent of video with larger picture resolution and/or frame rates, such as HD video, in televisions and consumer electronic (CE) devices is fostering a trend for additional HD or higher picture resolution television services, consequently resulting in higher bandwidth consumption in transmission channels and/or higher storage consumption. Increasing demand and requests for HD video services, higher picture fidelity, and user-dedicated bandwidth services, such as video-on-demand, pose challenges in management of transmission bandwidth and storage capacity.

However, service providers have invested in equipment and network infrastructure designed to support established video compression formats that correspond to the semantics and syntax of adopted video coding specifications, such as any of the existing video coding specifications documented by international standards. Established video compression formats have been around for some years, such as MPEG-2 (Motion Pictures Expert Group) Video. Likewise, consumers and service providers have invested CE products designed to support adopted video compression formats for interoperability reasons.

Although it is desirable to provide video compression performance better than what an adopted or "first" video compression format is capable of providing, it is also desirable to preserve investments in existing equipment, network infrastructure, and CE devices, by providing the capability to convert video from the established video compression format to a second video compression format that yields superior video compression performance. It is further desirable to leverage from information associated with the video coded with the first video compression format to reduce the processing burden in a compression engine that performs compression of the video into a second video compression format. Thus, it is desirable to accomplish the conversion of video from the first to the second video compression format while simultaneously maintaining minimum processing complexity and preserving the picture fidelity of the video signal.

A description of the aforementioned video coding international standards can be found in the following publications, which are hereby incorporated herein by reference: (1) ISO/IEC 11172-2 (1993): "Information technology—Coding of moving pictures and associated audio for digital storage media at up to about 1.5 Mbits/s—Part 2: video;" (2) ITU-T Recommendation H-262 (1995)|ISO/IEC 13818-2 (1996): "Generic coding of moving pictures and associated audio information: Video;" (3) ITU-T Recommendation H.261 (1993): "Video codec for audiovisual services at p×64 kbits/s;" (4) ITU-T Recommendation H.263 (1998): "Video coding for low bit rate communication;" and (5) "ISO/IEC 14496-2 (2001): Information technology—Coding of audio-visual objects—Part 2: Visual."

Many motion estimation methods are known. See for example U.S. Pat. No. 6,016,163 titled "Methods and apparatus for comparing blocks of pixels" and U.S. Pat. No. 6,195,389 titled "Motion estimation system and methods." Typically, motion estimation is a computationally intense process, likely imposing the most processing and/or computational burden. Some motion estimation techniques consider not only offsets of an integer number of pixels, but also fractional pixel offsets, so that the search for a match is a particular computationally intense task.

It is an object of the system and methods disclosed herein to overcome the foregoing problems in motion estimation when converting video from a first to a second video compression format while simultaneously maintaining low processing complexity and preserving the picture fidelity of the video.

DETAILED DESCRIPTION

Figure 1:
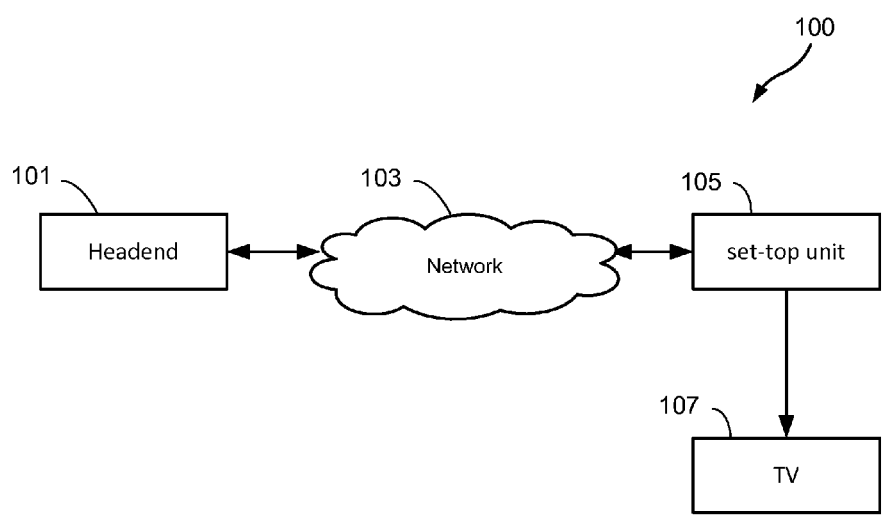
FIG. 1 shows a high-level block diagram illustrating an example video distribution system that may include one or more embodiments of the present invention.

Disclosed herein are systems and methods that guide conversion of a video stream of a program or movie, or portions thereof, from a first to a second video compression format. The video conversion can be achieved in a CE device or a network apparatus capable of receiving and/or storing a video stream compressed in the first video compression format. Examples of CE devices include a handheld device with video processing capabilities or digital video receiver, such as a set-top terminal (STT). Examples of network apparatus include a CE device in a local network such as a home network, or a remote electronic device or equipment with capability to receive and process a video stream that is located, for example, at a headend.

Embodiments of the present invention includes a method, and apparatus, and logic encoded in one or more computer-readable tangible medium to carry out a method of converting video information from a first compression format to a second compression format, including receiving data for a sequence of pictures in the first compression format, the received data including a video stream corresponding to a video program and including for a picture that is inter coded motion vectors and quantized transform coefficients of residuals of motion compensated inter-coded blocks. The converting also includes extracting auxiliary information including one or more auxiliary data elements from the received data; and converting from the first compression format to the second compression format, including carrying out motion estimation for blocks of image data in the second compression format. Carrying out motion estimation for blocks of image data in the second format includes using the auxiliary information to ascertain whether to use a first motion estimation method or a second motion estimation method different from the first motion estimation method.

Particular embodiments may provide all, some, or none of these aspects, features, or advantages. Particular embodiments may provide one or more other aspects, features, or advantages, one or more of which may be readily apparent to a person skilled in the art from the figures, descriptions, and claims herein.

It is noted that "picture" is used throughout this specification as one from a sequence of pictures that constitutes video, or digital video, in one of a plurality of forms. Furthermore, throughout this specification the terms "compression format" and "video compression format" have the same meaning. In context of converting from a first to a second compression format, a first video compression format corresponds to a first video coding specification (and its corresponding syntax and semantics), and a second video compression format corresponds to a second video coding specification (and its corresponding syntax and semantics) that is different to the first video coding specification. Throughout the specification, conversion from a first to a second compression format may be referred to as transcoding or a transcoding (or transcode) operation. Throughout the specification, video programs should be understood to include television programs, movies, or provided video signals such as those provided by a video camera. Such video programs comprise of signals and/or compressed data streams corresponding to an ensemble of one or more sequence of elements that include video, audio, and/or other data, possibly with data that provisions the synchronization of the sequence of elements. For video, the sequence of elements is a sequence of pictures. For audio, the sequence of elements corresponds to a sequence of audio frames. Other data may be the close captions or subtitles associated with the video program.

Throughout this specification, the compressed video stream of a video program may be referred to as the video stream.

Digital video comprises a sequence of digital pictures in which each picture is typically encoded with a brightness component and two color components. The digital representation of a video signal is typically a sequence of pictures, in which each picture includes a luma component (Y), representative of brightness, and two chroma components that are respectively color difference signals, Cb (Blue—Y) and Cr (Red—Y).

Each digital picture is typically represented as a two-dimensional arrangement of picture elements or pixels. On a pixel basis, this can be restated as each pixel in a two-dimensional (2D) array having a trio of respective values for Y, Cb, and Cr. However, the Cb and Cr pair may be specified at a smaller 2D resolution than the resolution of the picture. Thus, the chroma component can be shared among neighboring pixels for compression purposes, and when necessary, their values can be derived or upscaled respectively with upsampling filters to produce the 2D resolution equivalent of the Y component.

A "picture" may be referred to a "frame" or "field" depending on whether it is coded (i.e., compressed) as a full progressive picture associated with a single instance of time or as a field, which may or may not correspond to an interlaced picture.

The terms video coding and video compression are used herein interchangeably. A codec performs coding (also referred to as encoding and compression) and decoding (also referred to as decompression). The compression methods used in the embodiments described herein include dividing each two dimensional picture into smaller non-overlapping rectangular regions, called blocks or macroblocks. A macroblock may be subdivided into smaller blocks. The blocks or macroblocks are encoded individually. The compression methods used in embodiment described herein include exploiting the correlation that exists between successive pictures, i.e., temporal redundancy and correlation that exists spatially within a single picture, i.e., spatial redundancy. Lossy compression also includes some loss of accuracy in a manner that is not that perceptible. In addition, once the temporal and/or spatial redundancy is removed, and some information is removed, some further compression is obtained by losslessly encoding the resulting lossy information in a manner that reduces the average length of codewords, including encoding values that are more likely to occur by shorter codes than values that are less likely to occur.

In motion pictures, there may be one or more parts of a picture that appears in a translated form in successive pictures, i.e., there may be one or more parts that move in the video sequence. The compression methods used in embodiments described herein are motion compensated in that they include determining motion—so called motion estimation—of one or more elements, e.g., a block, and compensating for the motion—so called motion compensation before exploiting any temporal redundancy.

In one embodiment, a first video compression format is such that motion estimation and motion compensation are applied at a block level, and block-based motion estimation and compensation techniques typically assume translational motion. For a to-be-code block, motion estimation determining a "match" in one or more one or more reference pictures to determine the displacement between the to be coded block in a to-be-coded picture to a "matched" block in the one or more reference pictures. Matching is according to one or more matching criteria. Each displacement is represented by a so called motion vector. By a reference picture is meant a picture that at the encoder can be assumed to be known or previously decoded at the decoder or decompression engine 203 in FIG. 2A. A reference picture might be a previous picture or some picture in the future. Motion vectors typically are losslessly encoded by providing information in the video stream that allows the decompression engine, herein also referred to as the decoder, to derive the motion vector to determine the motion compensated data to enable reconstruction of blocks in the process of decoding the coded pictures in the video stream.

By a predictor of a to-be-encoded block is meant one or more blocks, each corresponding to a respective reference picture, for which corresponding values of the pixels are derived to estimate (i.e., predict) the pixels in the to-be-encoded block (i.e., the current block been encoded). A block can have more than one predictor in one or more reference pictures. By a search space is meant the portion of a reference picture relative to the location of a clock that is processed by a compression engine performing motion estimation to find a predictor. A block can also have more than one predictor in different search spaces within the same reference picture.

During reconstruction, a decoder uses the motion vector together with additional information to predict and reconstruct block from reference blocks. Information in one of more reference pictures known at the decoder, e.g., picture that have already been decompressed serve to predict the pixel values in one or more blocks of the picture being decompressed.

Figure 2A:
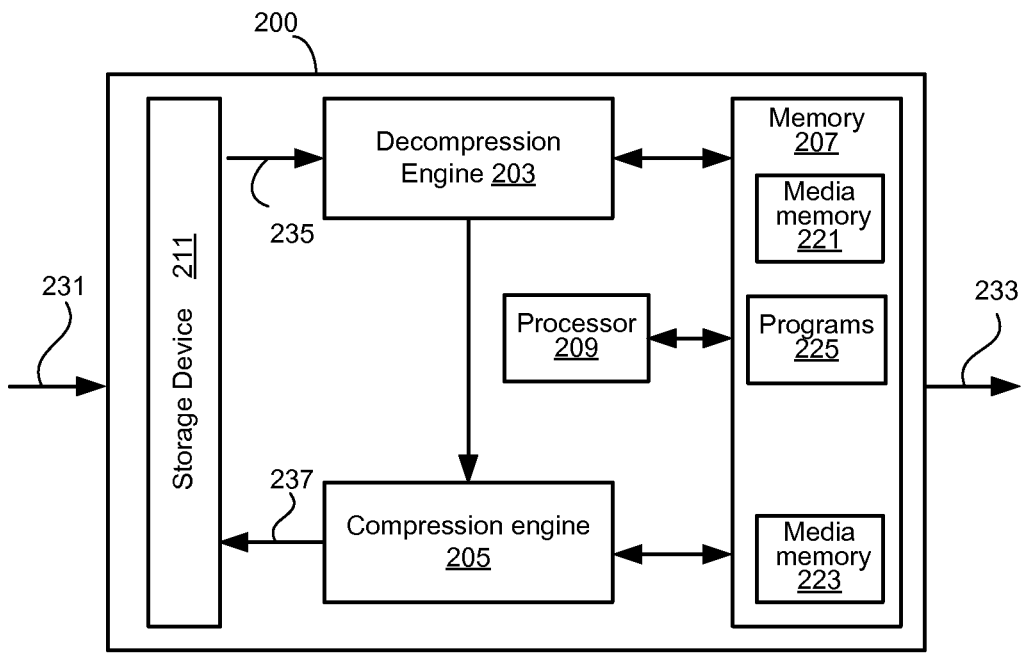
FIG. 2A shows a simplified block diagram illustrating an embodiment of an example transcoder that includes an embodiment of the present invention.
Figure 2B:
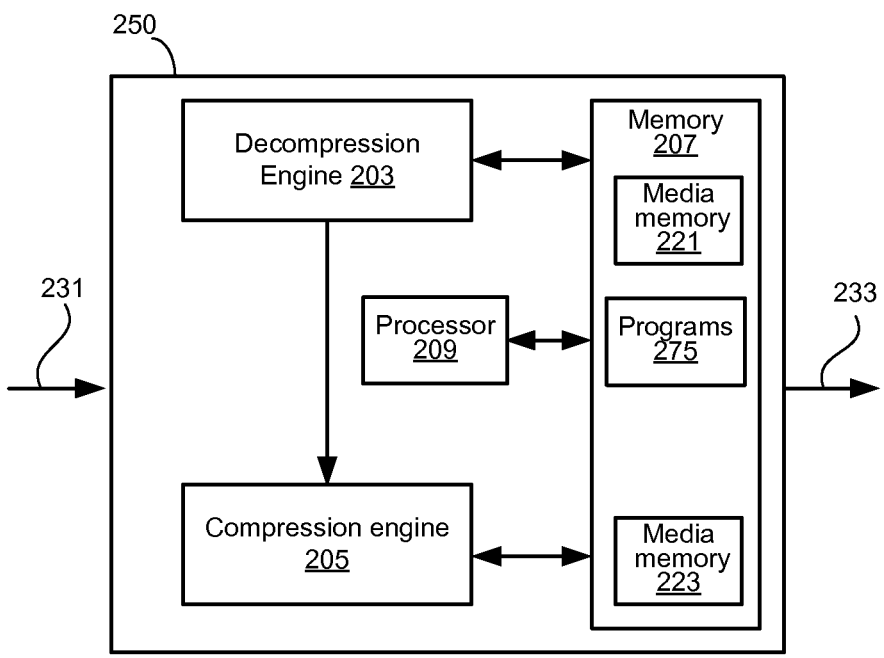
FIG. 2B shows a simplified block diagram illustrating another embodiment of a transcoder that includes an embodiment of the present invention.

A compression engine, such as compression engine 205 in FIG. 2B, may encode an input progressive picture that corresponds to the same instance of time either as a single frame or as two fields. The instance of time refers to time when the progressive picture was born. The compression engine may further associate two respective portions of a first coded frame that corresponds to a first progressive picture with two corresponding output times, and further associate two respective portions of a second coded frame corresponding to a second progressive picture with three output times, wherein one of the two portions of the second coded frame corresponds to only one of the three output times. In an alternate embodiment, the compression engine may further associate all of a third coded frame that corresponds to a third progressive picture with more than one corresponding output times.

The compression engine may encode two input consecutive fields that correspond to an input interlaced picture born from two successive instances of time (i.e., imaging instances) in an interlaced video camera, either as a frame associated with two respective instances of times, or as two coded fields, each associated with a respectively corresponding instance of time. Video coding (e.g., compression) methods work by exploiting data redundancy in digital video (e.g., a sequence of digitized pictures), as well as typically performing data decorrelation and some form of variable-length coding to compact information. Exploitation of data redundancy typically incorporates some form of exploiting data irrelevancy. In general, there are two types of redundancies in a video sequence, namely, spatial and temporal.

Video compression typically involves decomposing each picture into non-overlapping contiguous rectangular regions of pixels, called blocks or macroblocks, and encoding them individually. Since the visual scene expressed by the information of a video signal may exhibit motion, exploitation of the temporal redundancy can be achieved by using motion estimation techniques. Motion estimation techniques allow blocks at different spatial offsets in one or more reference pictures to predict the pixel values of one or more of the components corresponding to a block of the current picture being compressed. Whereas motion estimation is performed during compression, motion compensation is performed during video decompression by the video decoder, and also by the compression engine to emulate the data that the video decoder produces. The video decoder uses information in the video stream (i.e., the compressed video bitstream) to derive motion vector information corresponding to a motion compensation operation. Motion compensation may correspond to information specified by more than one motion vector, and each motion vector may be associated with a respective corresponding reference picture (i.e., pictures that have been decoded by the video decoder and retained in video decoder's memory for referencing purposes. For practical reasons, block-based motion estimation (and compensation) techniques typically assume only translational motion. Consequently, block-based motion estimation method is typically a key component of video compression.

Motion estimation is the process of finding the block, or combination of blocks, in one or more reference pictures that best match the block being encoded in the current picture, the current block. The information derived from one or more blocks in the one or more reference pictures that best matches the values of the pixels in the current block may be called the predictor, because it predicts the pixel values of the current block with the values of the pixels. The predictor may be derived from one or more blocks in the one or more reference pictures. As an example, if the block size is 16×16 pixels as is the case in the MPEG-2 Video coding standard, and the corresponding search space (e.g., the portion of a reference picture in which the encoding engine processes for a predictor) may be of size equal to 64×48. The motion estimation procedure comprises finding the contiguous 16×16 block in the search space that best matches the current block, in some cases at an integer granularity, and in other cases a sub-pixel accuracy granularity (such as performing half or quarter pixel around the best predictors found at the integer pixel granularity). Consequently, if integer offsets are only considered, there are 1617 (i.e., 49×33) different candidate predictors. The best candidate predictor typically chosen from among the candidate predictors is according to some matching criteria. The candidate block (i.e., candidate predictor) that best matches the current block is the predictor.

Block matching typically uses a matching criterion such as the Sum of Absolute Differences (SAD) between the pixel values of one or more of the three components, Y, Cb and Cr, in the current block and the corresponding component values in the candidate predictor. The candidate predictor that minimizes the matching criterion is selected as the predictor and its corresponding 2D translational displacement (i.e., offset) from the coordinates of the current block becomes a motion vector corresponding to the predictor for the current block. The motion vector is encoded in a way that it is fully derivable from information provided by the compression engine in the compressed video stream produced by the compression engine. The compression engine performs the video compression so that a decompression engine that is compliant to the same video compression format specification can perform motion compensation during the decompression and reconstruction of the coded version of the current picture. Hence, the output of motion estimation is one or more motion vectors, each respective associated with a corresponding reference picture, that comprise information collectively to derive the predictor for the current block.

Furthermore, if sub-integer offsets in the search space are considered in motion estimation to find a more precise predictor, such as half or quarter pixel offsets, the number of candidate predictor would be even greater. Likewise, if motion estimation is performed in more than one reference picture to find the predictor, there is a multiplicative increase in the total number of candidate predictor. It is also possible for the current block to be predicted from a weighted average of two predictors, each possibly found as the best matching predictor in two different search spaces, and each search space may correspond to two different reference pictures. For instance, in the MPEG-2 Video coding standard, the current block can be bi-predicted from two reference pictures (i.e., previously decoded), such that a first reference picture of the two reference pictures corresponds to a prior output time (in relation to the current picture been decoded), and the second reference picture corresponding to a future output time (in relation to the current picture been decoded), and thus referred to as a bi-directional prediction. Furthermore, the weights corresponding to the each of the predictors to derive the predictor in the bi-prediction operation are each 50 percent. In such event, there is yet another multiplicative increase in the number of candidate predictor.

In one embodiment, the two search spaces of bi-prediction operation correspond to the same reference picture. In another embodiment, both reference pictures in a bi-prediction operation correspond to future reference pictures. In yet another embodiment, both reference pictures in a bi-prediction operation correspond to past reference pictures The excessive amount of processing and computation for motion estimation is typically feasible in high-end compression engines but not economically practical in low-cost CE devices such as a set-top terminal (STT) that receives compressed video from a network via a transmission channel or another coupled CE device (e.g., via a wired or wireless communication port). Furthermore, even in a high-end compression engine, it is desirable to reduce the processing burden imposed by motion estimation.

Embodiments of the present invention are used to convert video in a first compression format to video in a second compression format. One application is when the second video format includes motion estimation that may be more complex than for the first format because the second compression format is capable of a higher compression for similar video quality. One feature of embodiments of the present invention is to use auxiliary information, e.g., in the form of one or more auxiliary data elements such as parameters determined from the first compression stream, possible with one or more other parameters, to guide determining motion vectors usable for the same video data in a second compression format. He guiding can aid in reducing the computational burden, e.g., of determining motion vectors to use in the second format. In some cases, the aiding is such that there no always a need to carry out "full" motion estimation computation "from scratch" or such that motion estimation can start prior to fully decoding the video in the first format.

Referring now in more detail to the figures, FIG. 1 shows a high-level block diagram illustrating an example video distribution system 100 that may include one or more embodiments of the present invention. The example video distribution system 100 includes a headend 101 and a set-top unit 105 that are coupled via a network 103. The set-top unit 105, also referred as set-top terminal (STT), is typically situated at a user's residence or place of business and can be a stand-alone unit or integrated into another device, such as, but not limited to, a display device 107 such as a television display or a computer display, a device with integrated display capability such as a portable video player, and/or a personal computer.

The STT 105 receives video programs comprising their respective video, audio and/or other data portions as digitally encoded signals. The video portion of a video program is received as a compressed video stream according to the syntax and semantics of a first video compression format such as MPEG-2 video. The compressed video stream is modulated on a carrier signal, among others, from the headend 110 through the network 130 to STT 105. The STT 105 provides reverse information to the headend 101 through the network 103. Additionally or alternatively, the STT 105 can receive compressed video stream from a locally coupled device such as a video player or camcorder.

Throughout this specification, the compressed video stream of a video program may also be referred to as its video stream. Likewise, the compressed audio stream of the audio program may also be referred as its audio stream.

The network 103 can include any suitable medium for communicating television services data including, for example, a cable television network or a satellite television network, among others. The headend 101 and the STT 105 cooperate to provide a user with television functionality including, for example, broadcast video programs, access to information corresponding to each respective video program, such as part of an interactive program guide (IPG) application and corresponding IPG data, wherein a first type of information corresponding to the video program corresponds to the description of the respective video program's content, and a second type of information corresponding to the video program corresponds to attributes of the respective video program. The headend may further provide access to video-on-demand (VOD) presentations and respectively corresponding information for each VOD presentation, including the first and second types of information. The headend 101 can include one or more server devices (not shown) for providing video, audio, and textual data to client devices such as STT 105. The headend 101 and the set-top unit 105 also may cooperate to provide authorization signals or messages via the network 103 that enable the set-top unit 105 to perform one or more particular functions that are pre-defined to require authorization.

Details of the headend are not shown in FIG. 1. Those in the art will appreciate that a headend 101 can include one or more server devices for providing video programs, connections to other distribution networks with a mechanism to receive one or more programs via the other distribution networks, other media such as audio programs, and textual data to client devices such as set-top unit 105.

For simplicity, the disclosure will concentrate on the video stream of a program. In one embodiment, the headend 101 includes a transcoder configured to receive a compressed video stream according to the syntax and semantics of a first video compression format.

FIG. 2A shows a first embodiment of transcoder configured to transcode from a first compression format to a second compression format, and further to store one or more programs in local storage device 211, e.g., a local hard drive.

As shown in FIG. 2A, the transcoder 200 includes a decompression engine 203 and a compression engine 205. Also included in a processing system in the form of one or more processors 209 and a memory subsystem 207. The memory subsystem 207 includes executable instructions, shown as programs 225 that instruct the processor in combination with the decompression and compression engines to carry out the transcoding, including one or more embodiments of the present invention. The decompression engine 203 is configured to decompress data in the first format, e.g., MPEG-2 Video, while the compression engine 205 is configured to compress data into a second compression format, e.g., H.264. Each of the compression engine 205 and the decompression engine 203 has a respective media memory 221 and 223 in which media information is storable and from which media information is retrievable. In one embodiment, the media memory 221 of the decompression engine 203 and the media memory 223 of the compression engine 205 are in the memory subsystem 207. In an alternate embodiment, these are separate memory elements. In one such alternate embodiment, there is a direct link between the media memory 223 of the decompression engine 203 and the media memory 221 of the compression engine 205.

A video program 231 with its video stream in the first video compression format, for example MPEG-2 video, is received by the transcoder. The video program, e.g., all its corresponding streams and associated data, is stored in the storage device 211, e.g., by orchestrating sequential data transfers for the progressive data chunks of the video program's streams as they are being received. In one embodiment, the video program in the first compression format is retrieved sequentially from the storage device 211 and provided as input 235 to the decompression engine 203. The decompression engine 203 is operative to store the input video program in a portion of a media memory 223, where it can then be retrieved for decompression. The decompression engine 203 is operative to process the video in the first compression format, including to extract auxiliary information, e.g., as one or more auxiliary data elements from the video and also to decompress the video to a sequence of decompressed pictures. The processing by the decompression engine 203 is according to the syntax and semantics of the first video compression format, e.g., MPEG-2 video, while reading and writing data to media memory 223.

In one embodiment, the decompression engine 203 is operative to output the extracted auxiliary data elements and the decompressed and reconstructed sequence of pictures to the compression engine 205 through a direct interface. In one embodiment, additionally or as an alternate, the decompression engine 203 outputs the auxiliary data elements to its media memory 221. Data transfers are then conducted to transfer the auxiliary data elements from media memory 221 to compression engine's 205 media memory 223. In one version, media memories 221 and 223 are part of the memory subsystem 207 and thus each of the decompression engine 203 and the compression engine 205 can access the contents of each of the media memories.

The compression engine 205 produces the video stream, audio stream, associated data with the video program in a multiplexed transport or program stream. The compression engine 205 reads and writes data from media memory 223 while performing all of its compression and processing operations and outputs the multiplexed stream through a direct interface to a processing system 209 such as a digital signal processor. In one embodiment, the processing system 209 causes the multiplexed transport or program stream in the second compression format, e.g., H.264, to be stored as input 237 in storage device 211. Additionally or alternatively, the video in the second compression format is provided as output 233 of the transcoder 200.

As described in more detail below, the transcoding is guided by one or more auxiliary data elements. In particular, the motion estimation used by the compression engine 205 to generate video in the second compression method is guided by the auxiliary data elements.

FIG. 2B shows a block diagram of an alternate embodiment 250 of a transcoder that, e.g., can be part of a set-top unit, or part of a headend, or part of any other element that performs transcoding. In this embodiment, the architecture is similar to the architecture of the transcoder 200 described above. That is, transcoder 250 includes a decompression engine 203, memory 207, and compression engine 205. The transcoder 250 does not include a storage device 211 as shown in the transcoder 200 of FIG. 2A. The decompression engine 203 receives video and audio streams, e.g., from a network instead of from a storage device. Additionally or alternatively, the transcoder 250 comprises a wired or wireless communication port (not shown) that serves to couple the transcoder to an external consumer electronic device such as a portable media player or a personal computer or some other device. The transcoder 250 can receive a video program from the consumer electronic device and then transcode the video program. Additionally or alternatively, the consumer electronic device can serve to interface the transcoder 250 to a home network and receive a video program locally via the home network.

Figure 3:
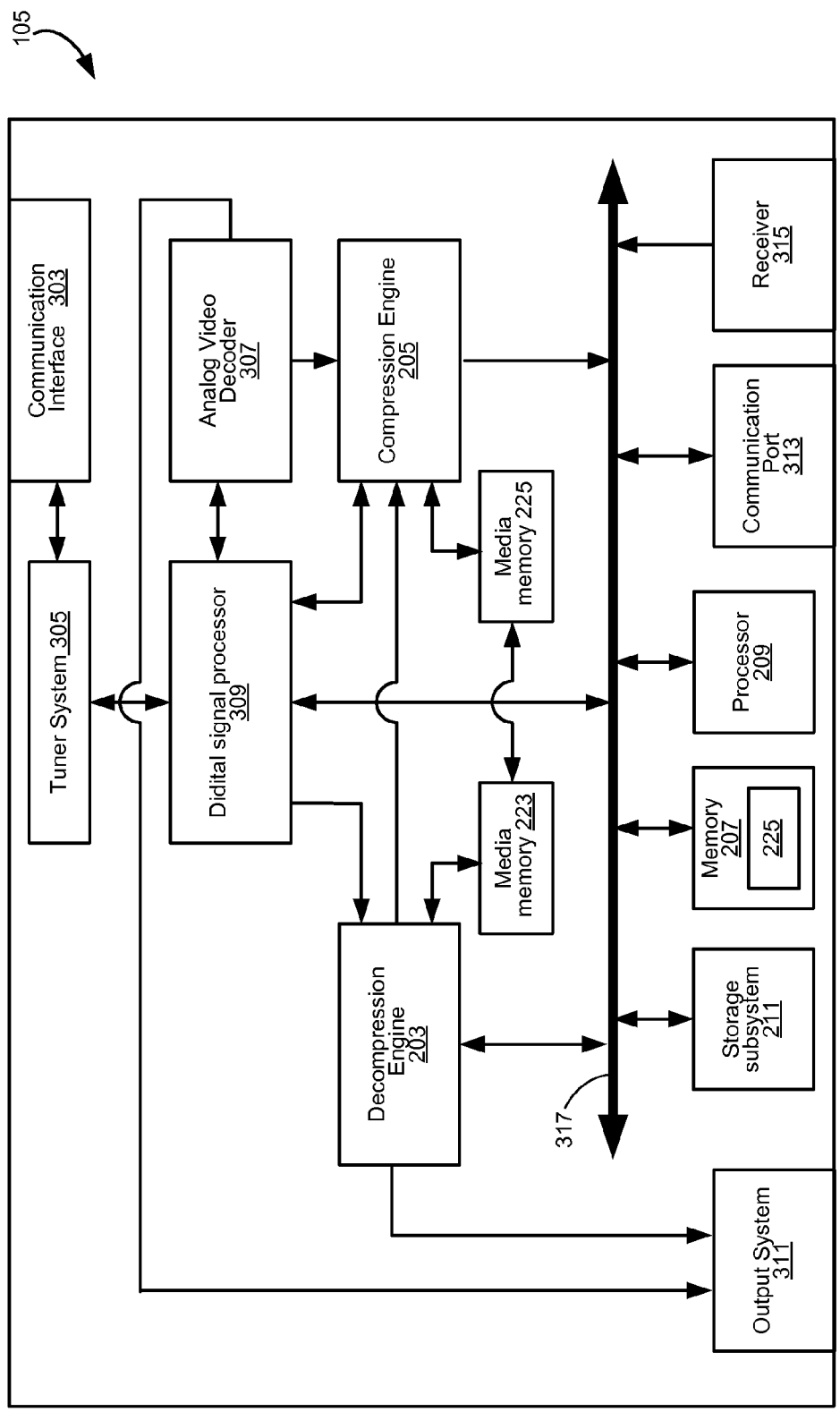
FIG. 3 shows a simplified block diagram of an embodiment of a set-top unit that includes an embodiment of the present invention.

FIG. 3 shows a simplified block diagram illustrating an embodiment of an example set-top unit 105 that includes an embodiment of the present invention. The set-top unit 105 includes the elements of the transcoder 200 shown in FIG. 2A. In particular, the set-top unit 105 includes a processing system that includes at least one processor 209 for controlling operations of the set-top unit 105, a memory 207, a storage subsystem 211, a communication port 313, e.g., in the form of one or more wireless or wired interfaces configured to receive and/or transmit video programs or data to other consumer electronics devices, a receiver 315 to receive externally-generated user inputs or commands from an input device such as, for example, a remote control. The various elements of the processing system are coupled to the processor via a bus system 317 shown in FIG. 3 for simplicity as a single bus. The processing system is operative to cause data transfers from one component to another within set-top unit 105.

In one embodiment, tuner system 305 serves to provision access or tuning to a particular television channel, video program or frequency and for sending and receiving various types of data or information to/from the headend 101. Additionally or alternatively, the STT 105 can include multiple tuners or other communication interfaces for receiving downloaded (or transmitted) data. The tuner system 305 enables the STT 105 to tune to downstream media and data transmissions, thereby allowing a user to receive more than one video program simultaneously or to receive other data, including authorization messages for video format conversion. The tuner system 305 includes, in one implementation, an out-of-band tuner for bi-directional quadrature phase shift keying (QPSK) data communication and a quadrature amplitude modulation (QAM) tuner (in band) for receiving television signals. Additionally, a receiver 315 receives externally-generated user inputs or commands from an input device such as, for example, a remote control.

In one embodiment, the set-top unit 105 also includes also an output system 311 for driving a display device, e.g., the display device 107 of FIG. 1.

In one implementation, video programs are received in the STT 105 via communication interface 303 (e.g., a coaxial cable interface) and stored in a temporary memory cache. The temporary memory cache can be a designated section of media memory 205 or another memory device (not shown) connected directly to the communication interface 303. Such a memory cache can be implemented and managed to enable data transfers to storage subsystem (also referred herein as storage device) 263211. In one embodiment, storage device 211 is a type of non-volatile memory that does not include any moving part In one embodiment, the set-top unit 105 includes a communication interface 303, e.g., a coaxial cable interface or a satellite receiver interface, configured to receive video programs, e.g., from the headend 101, and a tuner system 305 coupled to the communication interface 303 and configured for tuning to a particular television channel, a particular video program, or a particular frequency and for receiving (and possibly sending) various types of data from (and to) the headend 101.

The STT 105 includes signal processing system (digital signal processor) 309 for processing received or stored video programs, as well as receiving and storing information. One or more of the components of the signal processing system 309 can be implemented with software, a combination of software and hardware, or hardware (e.g., an application specific integrated circuit (ASIC)).

The signal processing system 309 includes video stream parsing capabilities that is specific to the video program. The signal processing system 309 communicates with processor 209 and decompression engine 203 to process a video stream in a first compression format. Information derived during decompression of the video stream is retained and provided or read by processor 209 to configure encoding of the decoded and reconstructed pictures (i.e., non-compressed pictures) of the video stream to a second compression format.

In one implementation, the one or more processors of the set-top unit 105 includes a digital signal processor 309 coupled to the tuner system 305 and to the processing system via the bus system 317. The digital signal processor 309 is configured to process video programs received via communication interface 303 or communication port 313. In one implementation, the digital signal processor 309 is configured to carry out one or more of demodulation, forward error correction, and transport stream demultiplexing for received video streams. In one implementation, the digital signal processor 309 is also configured to carry out parsing to extract data that is specific to the transport stream level or intended to be extracted during transport stream processing. In one implementation, the digital signal processor 309 further is configured to carry out filtering in or filtering out specific transport stream data or specific video program data. For example, filtering capabilities could serve to extract or assist in the extraction of data that is specific to the transport stream, a packetized elementary stream, an elementary stream, or a video program.

The set-top unit 105 also includes a decompression engine 203 coupled to the processing system via the bus system 317 and configured to decompress compressed video, and a compression engine 205 also coupled to the bus system 317 and configured to compress video. The decompression engine 203 also is coupled to and configured to accept compressed video from the digital signal processor 309. The compression engine also is coupled to and configured to accept information from the decompression engine 203.

The set-top unit has via interrupt and messaging capabilities that, for example, enable the digital signal processor 309 to communicate with the processor 209, the storage device 211, so that video, audio, and data streams corresponding to a video program that are output by the digital signal processor 309 can be stored in the storage device 211, or can be provided to decompression engine 203, where they can be decompressed and processed prior to being output to the display device 107 of FIG. 1. In one embodiment, the streams that are output by the digital signal processor 309 are stored in storage device 211 and simultaneously provided to decompression engine 203, where they are decompressed and processed prior to being output to the display device 107.

One embodiment includes an analog video decoder 307 that is coupled to the digital signal processor 309 operative to accept analog TV signals therefrom corresponding to a video program and convert the analog signals into a sequence of digitized pictures, and further to convert the analog audio to corresponding digital audio. In such an embodiment, the analog video decoder 307 is coupled to the compression engine 205 that is operative to accept the digitized information from the video decoder 307. Simultaneously, the digitized pictures and respective audio may be also output to television 107 via the output system 311. In such an embodiment, the digitized pictures and respective audio are output by the analog video decoder 307 in sequential display order.

The compression engine 205 is operative to compress video and audio information and multiplex the compressed information into a transport stream. One embodiment is operative to store the compressed transport stream(s) in the storage device 211, e.g., by orchestrating sequential data transfers for the progressive data chunks of the video program's streams as they are being output by compression engine 205.

The decompression engine 203 in the set-top unit 105 includes one of more subsystems or capabilities for video decompression and audio decompression. It also includes capabilities for processing data corresponding to the video program being decompressed. For example, the close caption data of a video program corresponding is typically received as picture user data (also known as user data) in the input video stream and processed.

The decompression engine 203 in the STT 105, or portions thereof, decodes or processes an input video stream in the first compression format, and the compression engine 205 receives the decoded video stream from the decompression engine 203, and produces a corresponding video stream in the second video compression format.

The output generated by decompression engine 203 from the input video stream in the first video compression format can be provided as input to compression engine 205 in one or more of several interfaces and/or methods. In one embodiment, it is provided via memory with the assistance of interrupt signals. In an alternate embodiment, decompression engine 203 and compression engine 205 are run in relation to a common video clock providing means to derive successive picture intervals, each picture interval designated for processing one picture in the sequence of pictures to be processed (e.g., for input, output, decoded, or encoded), wherein compression engine 205 derives the time to read each successive decoded picture produced by decompression engine 203 to read in relation to the common video clock, and specifically with a sufficient amount of delay that guarantees that decompression engine 203 has completed the full decoding and writing to memory 223 of the decoded picture (that was compressed in the first video compression format) to be read from memory 223 and coded (i.e., converted to the second video compression format) by compression engine 205. In one embodiment, memory 223 and memory 225 are part of a common memory to both decompression engine 203 and compression engine 205.

In yet another embodiment, compression engine 205 does not wait for the full decoded picture to be written into memory 223 (or 225) but is configured to wait until a certain number of rows of decoded macroblocks, N, have been decoded and written to memory by decompression engine 203, wherein, compression engine 205 then reads and processes the N rows of decoded macroblocks, and does not read the subsequent N rows of macroblocks of the decoded picture until the next N rows of decoded macroblocks of the picture are decoded and written to memory by decompression engine 203.

The output generated by decompression engine 203 comprises of auxiliary data elements and the sequence of decoded and reconstructed pictures corresponding to the version of the video stream in the first video compression format. The decompression engine 203 parses and decompresses the corresponding video according to the syntax and semantics of the first video compression format and processes, interprets, infers and/or derives auxiliary data elements to be output (such as by writing it to a portion of memory designated for this specific purpose) that assist compression engine 205 in converting the video stream to the second video compression format. The auxiliary data elements serve as guidance data that assist compression engine 205 to encode the sequence of decompressed and reconstructed pictures according to the syntax and semantics of the second video compression format.

In one embodiment, the compression engine 205 receives the sequence of decompressed and reconstructed pictures and the auxiliary data elements. The compression engine 205 employs the auxiliary data elements that correspond to the picture being encoded to guide its internal decision making to encode the picture.

In another embodiment, decompression engine 203 provides the auxiliary data to processor 209 and processor 209 derives the necessary information to configure compression engine 205 to perform the compression that results in the conversion of the decoded video stream to the second video compression format.

In an alternate embodiment, the decompression engine 203 does not perform the processing, interpretation and/or inferences to generate the auxiliary data elements that guide compression engine 205 to compress the sequence of digital pictures. Instead, the decompression engine 203 outputs a first set of auxiliary data elements that correspond to parsed and/or decompressed syntax elements from the compressed video stream. The compression engine 205 receives the first set of auxiliary data elements and performs the processing, interpretation and/or inferences to generate a second set of auxiliary data elements that guides the compression engine 205 to compress the sequence of decompressed and reconstructed pictures according to the syntax and semantics of the second video compression format.

In yet another embodiment, the processing, interpretation and/or inferences to derive or generate a second set of auxiliary data elements from the first set of auxiliary data elements that serves to guide compression engine 205 is performed by processor 209, in cooperation with digital signal processor 309. In yet another embodiment, the decompression engine 203 also cooperates in deriving or generating the second set of auxiliary data elements from the first set of auxiliary data elements.

In one embodiment, the transcoder, e.g., transcoder 200 or transcoder 250, e.g., in set-top unit 105 is operative to transcode one or more video programs received in a first format such as MPEG-2 into a corresponding video program in a second video format such as H.264. In one embodiment, the transcoding includes receiving data including a sequence of pictured in the first compression format; extracting one or more auxiliary data elements from the received sequence of pictures; and transcoding from the first to the second format, including carrying out motion estimation for blocks of image data in the second format. The motion estimation in the second format is guided by the auxiliary data elements.

In one embodiment, the received data includes additional information related to the received sequence of pictures. One example of such additional information is a program type from a pre-selected set of program types, e.g., from a program guide, or sent as side information with the program stream. One example of program type for such additional information is a program genre from a set of program genres, e.g., from a program guide, or sent as side information with the program stream. Another example of such additional information is authorization, e.g., one or more authorization messages to authorize one or more actions that include the conversion from the first to the second format, such as authorizing storage in the second compression format, retransmission in the second compression format, and so forth. When one or more types of such additional information are included in the received data, one embodiment includes extracting one or more additional auxiliary data elements from received data. The motion estimation in the second compression format is additionally guided by the auxiliary data elements.

In different embodiments, the transcoding is used for different functionalities provided by the set-top box or other component which include the transcoder. In one embodiment, the transcoding is such that the program can be locally stored in a more compressed format, e.g., in local storage such as the storage device 211. In one embodiment, the transcoding is carried out in response to an authorization message that provides authorization for one or more functions. Such authorization might be for a specific identified program, or for different types of programs, e.g., those of particular channels that a subscriber subscribes to, or only for particular types of programs, e.g., network programs, but not movies. In addition, an authorization exchange can occur to provide authorization for one or more specific programs. For example, a set-top unit 105 may be pre-authorized for one or more particular types of programs, and require explicit authorization signals for other types of programs.

The description herein is described for the case where the data includes a video stream in the MPEG-2 format, and wherein the second format is H.264. However, the invention is not meant to be limited to this case.

Furthermore, the technical details are described herein for the luma component. How to process the other components would be clear from the description herein.

MPEG-2 and H.264 have several common properties, and the inventors have discovered that one or more of these common properties can be used to make the transcoding more efficient than transcoding by fully decoding the MPEG-2 stream to a sequence of pictures, followed by encoding the sequence of pictures to H.264 format. One feature of the invention is using some of the common properties to guide the transcoding, in particular the motion estimation for the H.264 stream.

Each of H.264 and MPEG-2 divides each picture into non-overlapping macroblocks. A macroblock is the basic unit of a picture, and in the embodiments described herein, includes a 16×16 pixel rectangular non-overlapping region.

The luma and chroma samples of a macroblock are either spatially or temporally predicted. In the case of temporal prediction, the prediction of a block is from a corresponding block in a reference picture that can be in the past or in the future, or from corresponding blocks in a future reference picture and past reference picture in the case of bidirectional prediction. Each reference image is one that would be available for decoding at a decoder. The difference between the predicted block and the correct block is the residual image. The resulting prediction residual is transformed, the coefficients quantized, and the quantized coefficients ordered in a non-decreasing frequency order, e.g., a zig-zag path on a two-dimensional array. The transform coefficients are quantized and encoded using entropy coding methods, e.g., variable length coding or some other entropy coding method.

In the case of MPEG-2, motion estimation is carried out on each 16×16 macroblock. The search for best match of a corresponding block in a reference picture is carried out to a ½ pixel resolution. For predictive coding, each macroblock is further divided into 8×8 blocks, each forming a quadrant of the 16×16 macroblock. The transform used for MPEG-2 is the discrete cosine transform (DCT).

In the case of H.264, Partitions with luma block sizes of 16×16, 16×8, 8×16, and 8×8 samples are supported by the syntax of H.264. In case partitions with 8×8 samples are chosen, one additional syntax element for each 8×8 partition is transmitted. This syntax element specifies whether the corresponding 8×8 partition is further partitioned into partitions of 8×4, 4×8, or 4×4 luma samples and corresponding chroma samples. Furthermore, for any predictively coded M×N luma block, with M,N=4,8 or M,N=8,16, the residual image is transformed using a particular integer-valued transform—not the DCT which in general is not an integer valued transform.

Furthermore, motion compensation can be relatively more complex (and provide a much higher compression, albeit at the cost of computational complexity. H.264 supports more flexibility than MPEG-2 in the selection of motion compensation block sizes and shapes with a minimum luma motion compensation block size as small as 4×4, and with quarter-sample-accurate motion compensation. Various predictive or motion-compensated coding types are specified for inter prediction—so called predictive pictures and p_pictures. In H.264, these prediction methods are referred to as P macroblock types. In addition to the intra macroblock coding types, various predictive or motion-compensated coding types are specified as P macroblock types. Each P macroblock type corresponds to a specific partition of the macroblock into the block shapes used for motion-compensated prediction. The prediction signal for each predictive-coded M×N luma block (M,N=4,8 or M,N=8,16) is obtained by displacing an area of the corresponding reference picture, which is specified by a translational motion vector and a picture reference index indicating the reference picture. Thus, if the macroblock is coded using four 8×8 partitions and each 8×8 partition is further split into four 4×4 partitions, a maximum of sixteen motion vectors may be transmitted for a single P macroblock. Contrast this with MPEG-2, where for a single luma macroblock, four motion vectors for four 8×8 blocks of the macroblock are obtained.

H.264 also allows the motion-compensated prediction signal to be weighted and offset by amounts specified by the encoder to, e.g., potentially provide improved coding efficiency for scenes containing fades, and for other purposes.

In MPEG-2, values in a P-picture are obtained from one prior coded picture. H.264 allows for prediction based on more than a single prior coded picture.

While motion vectors in MPEG-2 point only to areas within a previously-decoded reference picture, picture extrapolation methods over a broader area can be used in H.264.

H.264 uses several intra coding types for a macroblock. Intra prediction is conducted in the spatial domain, by referring to neighboring samples of previously coded blocks which are to the left and/or above the block to be predicted.

In both MPEG-2 and H.264, a frame of video can be considered to contain two interleaved fields, a top and a bottom field. An interlaced frame is for the case that the fields were captured at different times. Otherwise, the frame is called a progressive frame.

Figure 4:
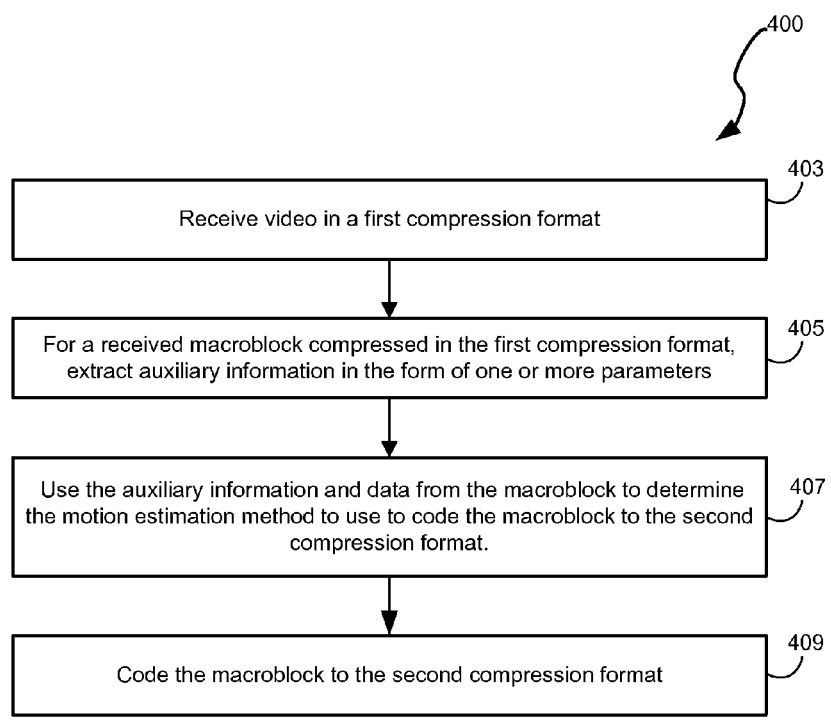
FIG. 4 shows a flow chart of one embodiment of a method of guided transcoding.

FIG. 4 shows one flowchart of a method of converting video from the first compression format, e.g., MPEG-2 to the second compression format, e.g., H.264.

Figure 5:
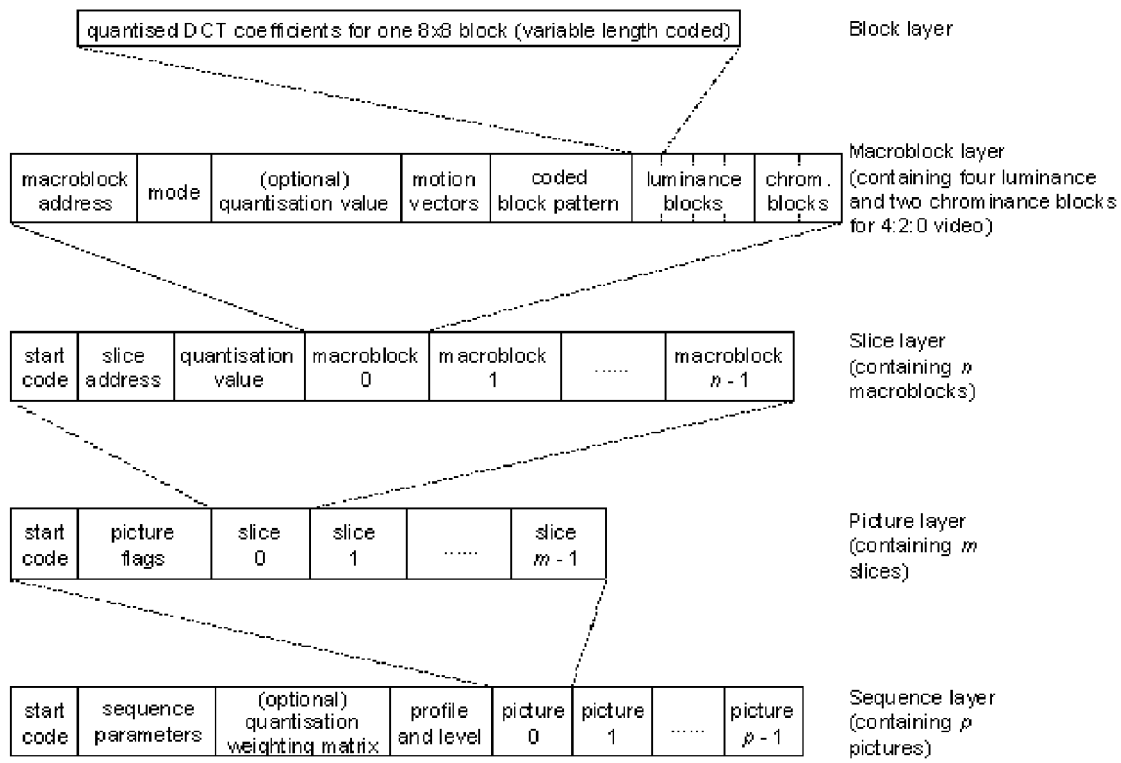
FIG. 5 shows in diagrammatic form the hierarchy of a typical video stream in the first compression format, in this case MPEG-2.

In one embodiment, the method includes in 403 receiving a sequence of pictures in the first compression format, e.g., MPEG-2. FIG. 5 shows in diagrammatic form the hierarchy of a typical video stream in the first compression format, in this case MPEG-2. For every predictively inter coded macroblock, received are: the motion vector(s) for the reference picture(s), an indication which reference picture(s) is/are used for the prediction, and of the quantized transform coefficients of the residuals of the motion compensated blocks.

The method includes in 405 extracting auxiliary information, e.g., as one or more auxiliary data elements. In one embodiment, the auxiliary information is in the form of a set of parameters. FIG. 5 shows how the syntax in the stream includes one or more parameters usable to guide the transcoding from MPEG-2 to H.264.

In one embodiment, the set of parameters includes the one or more motion vectors for the 16×16 macroblock.

In the case the macroblock is non-intra-coded macroblock that was coded as a P-type macroblock, the auxiliary information includes the motion vector for the 16×16 macroblock.

In the case the macroblock is non-intra-coded macroblock that was coded as a B-type macroblock, the auxiliary information includes either one motion vector for the 16×16 macroblock for predicting a 16×16 macroblock from a past reference picture, one motion vector for the 16×16 macroblock for determining a 16×16 macroblock from a future reference picture, or two motion vectors, each for predicting a 16×16 macroblock from one past and one future reference picture.

In 407, the method includes using the auxiliary information to ascertain whether to use a first motion estimation method or a second motion estimation method different from the first in the coding to H.264, the second compression format. The first motion estimation method is less complex than the second. The purpose is that in the transcoding, more accurate motion estimation is carried out only in macroblocks of blocks therein where there is an indication that the motion estimation already provided by the MPEG-2 motion vectors is not sufficient for the macroblock, that is, where there is an indication that further motion estimation is merited.

In one embodiment, the ascertaining uses one or more thresholds to compare respective values of the parameters to the thresholds.

In one embodiment, the first motion estimation method is to use the same motion vector as obtained from the received video in the first compression format—MPEG-2 and also encodes using the same type of encoding as for the macroblock in the first compression format. For example, if the macroblock is a P-type macroblock in MPEG-2 stream and its reference picture is the previous picture in the MPEG-2, using the first motion estimation method includes using the MPEG-2 motion vector and using the same reference picture to predict the macroblock in the H.264 format. The H.264 format reference picture in such a case would be the H.264 decoded version of the same picture encoded in the H.264 format.

Recall that in the MPEG-2 compression format, each 16×16 macroblock includes four 8×8 blocks (quadrants) denoted as Q1, Q2, Q3 and Q4 for the northwest, northeast, southwest, and southeast quadrants, respectively.

In one embodiment, the auxiliary information includes not only the motion vector, but also how the energy in the residuals is distributed amongst the four quadrants of the macroblock. The rational is that if the energy of the quadrant—an 8×8 residual image—is negligibly small, the motion estimation in the MPEG-2 input stream provided a pretty good prediction.

In one embodiment, the auxiliary information further includes the quantization level as indicated by the quantization parameter used in quantization during encoding. As shown in FIG. 5, the quantization parameter, shown as "quantization value" in the hierarchy, is typically extractable from the MPEG-2 video stream. A relatively high quantization parameter indicates relatively coarse quantization level, while a relatively low quantization parameter indicates a relatively fine quantization level. Thus, when the energy in a macroblock quadrant is significant, and furthermore, the MPEG-2 video stream indicates that a relatively high quantization parameter value was used, this is indicative of low quality motion estimation, so that further motion estimation may be warranted for producing the output H.264 compressed video. On the other hand, negligible energy in a quadrant and an indication that a relatively low quantization parameter value was used is indicative of a high quality prediction, such that the MPEG-2 motion vector may be usable in the H.264 compressed video without further motion estimation.

In one embodiment, the amount of energy in each quadrant is provided by the quantized DCT coefficients of the respective block in the MPEG-2 video. The DC coefficient, for example, in indicative of the total amount of energy in a block. In the embodiment that uses one of more DCT coefficients as an indicator of the amount of energy, no complete decoding of the MPEG-2 video is needed to make such a determination, so that the determination can be made ahead of any decoding of the blocks of data needed in order to re-encode using the H.264 transform. For example, in one embodiment, step 407 can start being carried out in parallel to starting the decoding of the MPEG-2 macroblock information.

In one embodiment, the energy in the four quadrants is compared to a threshold to determine how many quadrants have significant amount of energy as indicated by comparing a measure of the energy to a first threshold. If the measure of energy is less than the first threshold, the quadrant is said to have a negligible amount of energy, else it has a significant amount of energy.

In one embodiment, the first threshold is a value that is determined empirically. In one embodiment in which the one or more auxiliary data elements include the level of quantization, e.g., the quantization parameter, different first threshold values are used for different ranges of quantization parameters.

In one embodiment, the method includes receiving additional auxiliary information. The additional auxiliary information can be received as part of the video stream, or separate therefrom. One example of additional auxiliary information is the type of program, e.g., sports, movie, talking heads, and so forth. One example of receiving the type of program is from a program guide. Each type of program can be expected to have different amounts of motion. For example, talking heads program can be expected to have relatively little motion, so that many macroblocks will have small residual energy. Sports on the other hand can be expected to have a lot of motion, and much detail, so that even after motion compensation, the residual images may have significant energy. In one embodiment, the additional auxiliary information is used to determine what value to use for the one or more thresholds that are used in the determining step 407.

In one embodiment, the auxiliary information includes an indication of the total number of bits used to encode the picture in the first compression format, e.g., MPEG-2. This indication is indicative, for example, of the complexity of the scene. In one embodiment, an indication of the total number of bits used to encode the picture is used to determine what value to use for the one or more thresholds that are used in the determining step 407.

To continue with step 407, in one embodiment, if none of the quadrants have significant energy as indicated by the measure of energy less than the first threshold, the first motion estimation method is used for all four quadrants of the macroblock: the motion vector from MPEG-2 is used for motion compensation for all four 8×8 blocks in the H.264 coding. Furthermore, in such a case, the reference picture in the video encoded in H.264 that corresponds to the MPEG-2 reference picture is used for the prediction. That is, in the first motion estimation method, the MPEG-2 reference picture that is MPEG-2 video reconstructed and that undergoes H.264 compression and H.264 decompression and reconstruction is used as the reference picture.

To further continue with step 407, in one embodiment, if only one of the quadrants has significant energy as indicated by the measure of energy at least equal to the first threshold, in one embodiment, the first motion estimation method is used for the three quadrants that have negligible energy, while a second motion estimation method is used for the 8×8 quadrant that has significant energy. The first motion estimation method includes using the motion vector from MPEG-2 for motion compensation for the three 8×8 blocks in the H.264 coding. The second motion estimation method includes using more sophisticated motion estimation as possible with H.264 and as described in more detail herein below. Note that even in the case that the second motion estimation method is used, one feature of one embodiment of the invention is using auxiliary information to guide use of the second motion estimation method to reduce the computational complexity compared to carrying out full H.264 motion estimation.

To further continue with step 407, in one embodiment, if exactly two of the quadrants have significant energy, the same rules are used. That is, the first motion estimation method is used for the quadrants that have negligible energy, while the second motion estimation method is used for the quadrants that have significant energy.

In a different embodiment, if exactly two of the quadrants have significant energy, the second motion estimation method is used for all four quadrants.

In yet another embodiment, if exactly two of the quadrants have significant energy, the first motion estimation method is used for the quadrants that have negligible energy, e.g., using the motion vector from MPEG-2 for motion compensation for the two 8×8 blocks in the H.264 coding that have negligible energy, and a second threshold is used to further distinguish between the two quadrants that have significant energy. If a macroblock that has significant energy has a measure of energy less than the second threshold, a third motion estimation method is used for coding the 8×8 block in the second compression format: H.264, and if a macroblock that has significant energy has a measure of energy that meets or exceeds the second threshold, a fourth motion estimation method is used. In one embodiment, the fourth method is the same as the second method in the above embodiment that only has two motion estimation methods, while the third method is a motion estimation method that has less complexity than the second motion estimation method.

In one embodiment, the second threshold is a value that is determined empirically. In the embodiment that includes receiving additional auxiliary information used to determine what value to use for the first threshold, the second threshold also is determined using the receiving additional auxiliary information. One example is the type of program, obtained, for example, from a program guide.

In one or more embodiment, if three or more of the quadrants have significant energy, the second motion estimation method is used for all four quadrants, as there being a significant energy suggests there is a significantly large residual image, such that improved motion estimation is likely to produce improvement in compression and/or image quality. In yet another embodiment, if three or four of the quadrants have significant energy, intra-coding is considered for the macroblock. In one embodiment, the decision to code intra is made according to additional auxiliary information such as the type of video program.

The second or third motion estimation methods for each 8×8 block

As indicated above, in one embodiment, a second motion estimation method different from the first is used for some blocks. In yet another embodiment, a third motion estimation method different from the second and the third is used. Each of the second and third motion estimation method is in general more complex than the first motion estimation method.

Even in the case that a more complex motion estimation method is used, one feature of the invention is that auxiliary information is usable to guide the motion estimation for conversion to the second format—H.264 in the example.

In one embodiment, the reference picture for the second and third motion estimation methods is the MPEG-2 reference picture that is MPEG-2 video reconstructed and that undergoes H.264 compression and H.264 decompression and reconstruction is used as the reference picture.

In one embodiment, the auxiliary information is used to determine the block size for motion estimation for the second compression format, that is, the granularity for motion estimation.

Suppose it is determined that the second or third motion estimation method needs to be used for a quadrant, i.e., for an 8×8 block in the H.264 format. Recall that H.264 allows for motion estimation of different sized blocks. In one embodiment, the evenness of the distribution of the residual information within the 8×8 block is used to determine the block size for motion estimation for the second compression format.

One embodiment includes determining how much of the total residual information in an 8×8 block is contained in each 4×4 sub-block of the 8×8 block. One embodiment includes determining the sum of absolute values of the residual pixel values in the 4×4 sub-block. One embodiment includes comparing the determining sum of absolute values of the residual pixel values in the 4×4 sub-block relative to the total sum of absolute values in the 8×8 block, e.g., by comparing the relative contribution to a threshold. A perfectly even distribution of the residual would be indicated by each 4×4 contributing about 25% of the total. The threshold for evenness is selected such that if the error was unevenly distributed, the motion estimation for the second compression method is carried out at a granularity finer than the 8×8 block size. For example, in one embodiment, if any 4×4 sub-block has more than 50% of the total, than H.264 motion estimation is carried out at a 4×4 granularity for that macroblock. In alternate embodiments, different thresholds are used. In one embodiment, the thresholds are dependent on one or more additional parameters of auxiliary information, such as the type of program.

In one embodiment, in determining the relative amounts of residuals in each 4×4 sub-block, "isolated" pixels that have isolate high values are excluded from the determining. In one example embodiment, such isolated high difference values are excluded from the determining of the sum of absolute residual values.

Note that while one embodiment uses 4×4 granularity for the H.264 motion estimation, another embodiment first compares using 4×4 to using 8×8, and uses the motion estimation that produces the smaller error according to a motion estimation error criterion, e.g., sum of absolute differences, scaled for the different block size.

In addition, suppose it is determined to carry out motion estimation at the 8×8 granularity rather than the same motion vector for each 8×8 in the macroblock.

One embodiment uses auxiliary information including the MPEG-2 motion vector for the macroblock to determine the center of the search space for the H.264 motion estimation method.

It is known, e.g., in ITU-T recommendation H.263 to use motion vector prediction to encode the motion vector by coding the motion vector as the difference of a function of motion vectors of neighboring macroblocks. In particular, it is known to use the values of causally available macroblocks such as the motion vectors of the top left, top, top right and left macroblocks.

In one embodiment, the auxiliary information includes the MPEG-2 motion vectors of the causal neighbors. This information is used together with the MPEG-2 motion vector to provide a guide to the quality of the MPEG-2 motion vector, and further as a guide to where to search—the search space—in the H.264 motion estimation.

As an example, consistent values for the causal neighbor motion vectors are suggestive of a high quality MPEG-2 motion vector for the present macroblock. In such a case, in one embodiment, the MPEG-2 motion vector can be used. In the case it is ascertained to carry out H.264 motion estimation, the search space for the motion estimation can be limited by the knowledge of the high quality of the MPEG-2 motion vector.

In one embodiment, the values of the causal neighbor motion vectors are used to determine the reference macroblocks in the reference picture used to predict the respective causal neighbor macroblocks. The location in the reference picture of the reference macroblocks used to predict the respective causal neighbor macroblocks are used to define the search space for the H.264 motion estimation.

In another embodiment, rather than the MPEG-2 motion vectors of the causal neighbors, the determined motion vectors of the already encoded neighbor blocks in the H.264 coded picture are used to guide the search space for H.264 motion estimation of the present block.

Consider, for example, that it is determined to use 8×8 granularity for the second motion estimation method for any block whose residual energy exceeds a pre-defined threshold or threshold function of one or more parameters. While the above examples describe using the H264 decoded of the H.264 coded MPEG-2 reference as one reference picture for the second motion estimation methods that are more complex than the first motion estimation method, alternate embodiments use one or more additional reference pictures. Yet other alternate embodiments use a different reference picture. Yet another alternate embodiment uses a reference picture in the opposite direction, that is, prediction from a future reference picture.

In yet another embodiment, the second motion estimation method that is applied to the 8×8 quadrant uses bi-prediction for that quadrant according to the syntax and semantics of H.264. In one such embodiment, the whole macroblock is signaled as a bi-predicted macroblock, the quadrant that uses the second motion estimation method uses bi-directional prediction, and the other quadrants are each predicted using only a single motion vector and a single reference picture. Other embodiments use different types of motion estimation for the second motion estimation method that is applied to the 8×8 quadrant: one uses two motion vectors using two past reference pictures, another uses two motion vectors using two future reference pictures.

In yet another embodiment, the second motion estimation method uses a single reference picture as described above, and it is that third motion estimation method that is more complex than the third and that is applied to an 8×8 quadrant uses bi-prediction for that quadrant according to the syntax and semantics of H.264. In one such embodiment, the whole macroblock is signaled as a bi-predicted macroblock, the quadrant that uses the third motion estimation method uses bi-directional prediction, and the other quadrants are each predicted using only a single motion vector and a single reference picture. Other embodiments use different types of motion estimation for the second motion estimation method that is applied to the 8×8 quadrant: one uses two motion vectors using two past reference pictures, another uses two motion vectors using two future reference pictures.

While the embodiment above described using an indicator of the total energy in each 8×8 quadrant of a macroblock, e.g., as indicated by the DC quantized DCT coefficient of the 8×8 residual, in one embodiment, how the energy in the residual images of the quadrants in the macroblock is distributed amongst the four quadrants includes not only the indicator of total energy, but also how the non-DC quantized DCT coefficients of the residual images of the quadrants in the macroblock are distributed in each of the four quadrants.

In one such embodiment, the amount of energy in each quadrant is provided by the quantized DCT coefficients of the respective block in the MPEG-2 video. Two thresholds are defined: one of the DC coefficients as in indicator of the total energy in each 8×8 quadrant of the residual, and at least one threshold for AC coefficients. In one embodiment, a quadrant is ascertained to be significant if both the DC coefficients is greater than a DC threshold, and also if the sum of amplitudes of the AC coefficients is greater than an AC threshold. As described above for the case of only using the DC coefficient, each threshold may be a function of one or more parameters of auxiliary information. One such auxiliary information parameter is the quantization level. Another is the type of program, which can be indicated as information provided by a program guide.

Alternate embodiments can use different partitioning of the AC coefficients and examining the energy in each such partition as indicated, for example, by the sum of magnitude of the quantized DCT coefficients. In such embodiments, assume the quantized DCT coefficients are ordered in increasing frequency, e.g., according to a zig-zag two-dimensional pattern.

Interlaced coding is now described in more detail.

In MPEG-2, an interlaced video sequence uses one of two picture structures: frame structure and field structure. The interlaced video sequence can switch between frame structures and field structures on a picture-by-pictures basis.

In the field structure, the two fields of a frame are coded independently of each other, and the odd field is followed by the even field. Each of the two fields has its picture header. In such a type of coding, each field's MB is encoded as a separate picture, and the details described above for the example embodiments are exactly applicable.

In the frame structure, lines of two fields alternate and the two fields are coded together as a frame. One picture header is used for two fields.

Thus, in MPEG-2, a macroblock may be coded as an interlaced macroblock in a frame type. In such a case, an MPEG-2 motion vector corresponds to a 16×8 portion of the macroblock. Thus, the MPEG-2 motion vector corresponds to two 8×8 blocks.

Recall each frame corresponds to a top field, e.g., of even numbered rows of the frame, and a bottom field, e.g., of odd-numbered rows of the frame. Thus, as an example, starting with a top row numbered 0, every other row corresponds to a top 16×8 portion, and starting with the second row numbered 1, every other row corresponds to a bottom 16×8 portion.

In one embodiment, the same methods as describe in relation to four 8×8 quadrants of a macroblock that has a single MPEG-2 motion vector can be performed except they are applied in the interlaced frame type the energy in the 8×8 halves of the 16×8 portion of the macroblock.

The H.264 standard uses adaptive frame/field coding operations. In interlaced frames with regions of moving objects or camera motion, two adjacent rows typically tend to show a reduced degree of statistical dependency when compared to progressive frames in. In this case, it may be more efficient to compress each field separately. To provide high coding efficiency, the H.264 standard allows encoders to make any of the following decisions when coding a frame: A) to combine the two fields together and to code them as one single coded frame (frame mode); B) to not combine the two fields and to code them as separate coded fields (field mode); C) to combine the two fields together and compress them as a single frame, but when coding the frame to split the pairs of two vertically adjacent macroblocks into either pairs of two field or frame macroblocks before coding them.

Thus the H.264 standard encodes interlaced macroblocks in pictures encoded as frames, which are signaled as 16×32 rows. In one embodiment two vertically adjacent macroblocks in the first format, i.e., two vertically adjacent MPEG-2 macroblocks assessed to determine if they were both encoded as interlaced macroblocks and have the same motion vectors or very similar motion vectors, such that their motion vectors are usable to guide the motion estimation in the H.264 format. The MPEG-2 motion vectors may be usable as auxiliary information to guide the motion estimation, and the distribution of the residual energy usable to determine the segmentation of the 16×32 region into smaller portions. The respective motion estimation methods can be then used in the segmented portions according to the estimated energy of the residual signal obtained by using the candidate motion vectors.

In one embodiment, the following truth table is used to ascertain how many MPEG-2 motion vectors are usable as auxiliary information to guide the motion estimation for the H.264 format. Recall that if a top or bottom macroblock is non-intra coded as not interlaced, then the same MPEG-2 motion vector is used for a whole 16×16 macroblock. If a top or bottom macroblock is non-intra coded and interlaced, then there are MPEG-2 two motion vectors, one for each 16×8 portion. If a macroblock is intra-coded, no MPEG-2 motion vectors are involved.

| Top Macroblock | Bottom Macroblock | No. of motion vectors provided as auxiliary information by MPEG-2 video |
|---|---|---|
| Not-interlaced | Not-interlaced | 2 motion vectors; each macroblock is treated independently as described above for non-interlaced |
| Not-interlaced | Interlaced | 3 motion vectors for 16x32; 3 MPEG-2 motion vectors are treated as auxiliary information |
| Interlaced | Not-interlaced | 3 motion vectors for 16x32; 3 MPEG-2 motion vectors are treated as auxiliary information |
| Interlaced | Interlaced | 4 motion vectors for 16x32; 4 MPEG-2 motion vectors are treated as auxiliary information |
| Intra-coded | Not-interlaced | The non-interlaced part treated as before, or use MPEG-2 one motion vector as auxiliary information |
| Intra-coded | Interlaced | Use two motion vectors as auxiliary information for bottom macroblock and based on resulting residual, perform H.264 transform to coefficients then break into smaller blocks according to distribution of energy |
| Non intra, not-interlaced | Intra-coded | Use one motion vector as auxiliary information |
| Interlaced | Intra-coded | Use two motion vectors as candidate predictors for top macroblock and based on resulting residual, perform H.264 transform to coefficients then break into smaller blocks according to distribution of energy |

Operation of the Transcoder

Figure 6:
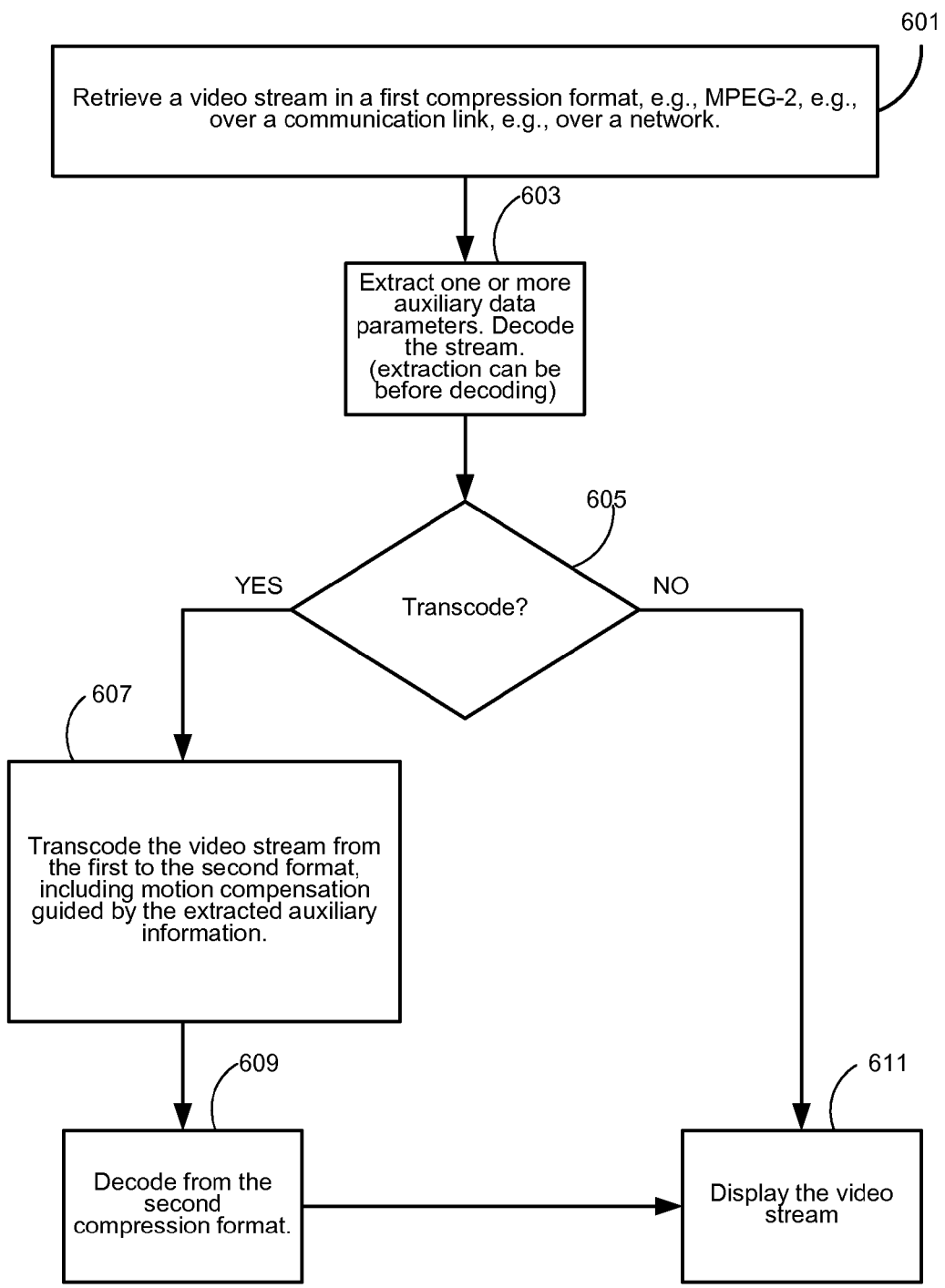
FIG. 6 shows a flow chart illustrating an embodiment of an operation of a set-top unit when a video program is received

FIG. 6 is a flow chart illustrating an embodiment of an operation of a set-top unit such as set-top unit 105 when a video program is received. In 601, a video stream in a first video compression format, e.g., MPEG-2 is retrieved, e.g., over a network and is processed in 603 to extract auxiliary information associated with the video stream. In some embodiments, 603 includes at least partially decoding the video stream. In 605 it is decided whether or not to transcode the stream to a second compression format, and if not in 611 the decoded video stream (assuming 603 includes decoding) is displayed. For example, in one embodiment, the set-top unit 105 decides to transcode the video stream if the format is not in a desirable format, e.g., is not already in the second, e.g., H.264 compression format. In one embodiment, the set-top unit 105 decides to transcode the video stream if the auxiliary information instructs the set-top unit to transcode the video stream. If the set-top unit determines that there should not be transcoding, the decoded video stream in the first video compression format can be displayed on a display device, as indicated in step 611. If the set-top unit determines that the video stream should be transcoded, the set-top unit in 607 encodes the decoded video stream from the first video compression format to a second video compression format, including using the auxiliary information to guide motion compensation as described above. The video stream in the second video compression format is decoded and displayed, as indicated in steps 416 609 and 611. Additionally or alternatively, the set-top unit 105 stores the video stream in a storage device, for example, a hard drive 211 that is coupled inside the set-top unit or in a coupled a consumer media playback device such as an Ipod® or personal computer. Additionally or alternatively, the set-top unit stores the video stream in a storage device if the set-top unit receives authorization messages over the network.

One feature of an embodiment of the invention is that the transcoding occurs in real time. The retrieval of the video program with its video in the first video compression format, the decompression operations by decompression engine 203, compression operations by the compression engine 205, and the storing of the video program with its video in the second video compression format are initiated, controlled and orchestrated by controlling sequential data transfers in a time-coordinated manner to fulfill the format conversion operation from start to end of the video program.

In one such embodiment that is operative in a video distribution system such as shown in FIG. 1, the headend 101 provides authorization signals or messages via the network 103 that enable the transcoder 200 to perform corresponding authorized functionality, such as the authorization for the transcoder 200 to perform conversion of video from a first to a second video compression format. The headend 101 can further authorize the video format conversion functionality in the transcoder 200 to a particular video program or, alternatively, to a particular set of video programs. Authorization to perform video format conversion for particular video programs can be specified according to a type of video program, e.g., news programs, by program title, by video program rating, by the type of content in the video program, e.g., violence, adult, children, etc., or by one or more specified television channels in the authorization.

In one such embodiment, video format conversion of a video program in the transcoder 200 is authorized only if the video program has or carries a type of copyright. For example, a type of copyright can have a particular qualification that allows video format conversion. Alternatively, the authorization for video format conversion can comprise of any combination of two or more of these specifications.

Another authorization can be for the purpose of time-shifting viewing of a video program, wherein the video program is recorded in a designated portion of the storage device 211 that serves as a buffer to enable instant pause and random access of the video program.

In another embodiment, the headend 101 can authorize the video format conversion functionality in the transcoder 200 specifically to a particular service, such as for video programs corresponding to a video on demand (VOD) service. It is noted that each television channel is often considered a respective television service. Hence, authorization by service extends to enabling video format conversion for the video programs received via a particular television channel. Alternatively, the authorization for video format conversion can comprise of a specification of any combination of two or more particular services.

In yet another embodiment, the headend 101 can authorize video conversion from a first to a second video compression format in the transcoder 200 for a specified compression format. For instance, the transcoder 200 can be authorized to perform video format conversion for video programs compressed according to the MPEG-2 video specification. It should be noted that in such case MPEG-2 video is the first video compression format. Alternatively, the authorization to perform video format conversion in the transcoder 200 can be for any video program compressed according to any of the compression formats specified in a set of two or more compression formats.

In another embodiment, the headend 101 can authorize video conversion from a first to a second video compression format in the transcoder 200 for video programs that have a particular picture format. For example, the authorization can allow conversion of HD video programs, standard definition (SD) video programs, or video programs with pictures format smaller than SD. Alternatively, the authorization for video format conversion can comprise of video programs in two or more picture formats.

Some Alternate Set-Top Unit Elements

Note that the architecture of the set-top unit 105 shown in FIG. 3 is merely illustrative and should not be construed as implying any limitations upon the scope of the preferred embodiments of the invention. For example, in another embodiment, the set-top unit 105 can have fewer, additional, and/or different components than illustrated in FIG. 3. For example, the set-top unit could be a Digital Home Communication Terminal or a set-top unit as described in U.S. Pat. No. 7,136,417, or as in U.S. patent application Ser. No. 10/663,037 published as US 20050074063. The contents of each of U.S. Pat. No. 7,136,417 and U.S. patent application Ser. No. 10/663,037 are incorporated herein by reference.

While a set-top unit 105 with a tuner system 305 is shown, additionally or alternatively, the set-top unit 105 can include multiple tuners for receiving downloaded (or transmitted) data. The tuner system 305 enables the set-top unit 105 to tune to downstream video programs and data transmissions, thereby allowing a user to receive more than one video program simultaneously or to receive other data, including authorization messages for video format conversion. In one version suitable for cable systems, the tuner system 305 includes, in one implementation, an out-of-band tuner for bi-directional quadrature phase shift keying (QPSK) data communication and a quadrature amplitude modulation (QAM) tuner (in band) for receiving television signals. Additionally, a receiver 315 receives externally-generated user inputs or commands from an input device such as, for example, a remote control.

In some implementations, received in the set-top unit 105 via communication interface 303 are stored in a temporary memory cache which can be a designated section of memory subsystem 207 or, in an alternate embodiment, another memory connected directly to or that is part of the communication interface 303. Such a memory cache can be implemented and managed to enable data transfers to storage device 211 or other components in set-top unit 105, such as decompression engine 203.

In one implementation, the set-top unit 105 communication port 313, e.g., in the form of one or more wireless or wired interfaces configured to receive and/or transmit video programs or data to other consumer electronics devices, such as, but not limited to, a display device 107, another set-top unit, a video player and/or a personal computer. For instance, the set-top unit 105 can feature USB (Universal Serial Bus), Ethernet, IEEE-1394, serial, and/or parallel ports, etc.

In one implementation, the demultiplexing carried out by digital signal processor 309 includes transport stream demultiplexing such as demultiplexing a received MPEG-2 transport stream. When tuned to carrier frequencies carrying a digital transmission signal, the demultiplexing operation separates packets of data corresponding to the streams of the desired video program for further processing. Concurrently, the demultiplexing operation precludes further processing of packets in the multiplexed transport stream that are irrelevant or not desired, such as packets of data corresponding to other video programs.

In one implementation, the digital signal processor 309 is also configured to carry out demultiplexing, parsing, extracting, separating and filtering data in multimedia specific program streams encapsulating a video program, such as the MPEG-2 program stream, such as video programs in a program stream from a local consumer electronics product via communication interface 303.

Those in the art will understand that one or more of the elements of the digital signal processor 309 can be implemented by software executing on a processing system, by a combination of such software with hardware, or by hardware only. The hardware and any programmable processing elements that execute software may be implemented by an application specific integrated circuit (ASIC).

In one implementation, the memory subsystem 207 is encoded with logic, e.g., computer executable instructions shown as a set of programs 225 in the memory subsystem 207 that when executed by the one or more of processors 209, 309, cause the set top unit 105 to carry out one or more of the methods described herein, e.g., in conjunction with the compression engine 205 and the decompression engine 203. Furthermore, in one embodiment, the instructions 225 encoded in memory subsystem 207 include instructions for operating one or both of the compression engine 205 and the decompression engine 203. Those in the art will understand that although the programs for the processor 209 and/or the digital signal processor 309 and/or instructions for the compression engine 205 and/or decompression engine 203 are shown as one block 225, this is a simplification, and in an actual system, not all of the logic resides in the memory subsystem 209. Some, for example, might reside in the storage subsystem and be loaded into the memory subsystem 209 as needed. Such details are left out so as not to obscure the inventive features of the invention.

Some Alternate Configurations in which a Transcoder can Operate

Figure 7:
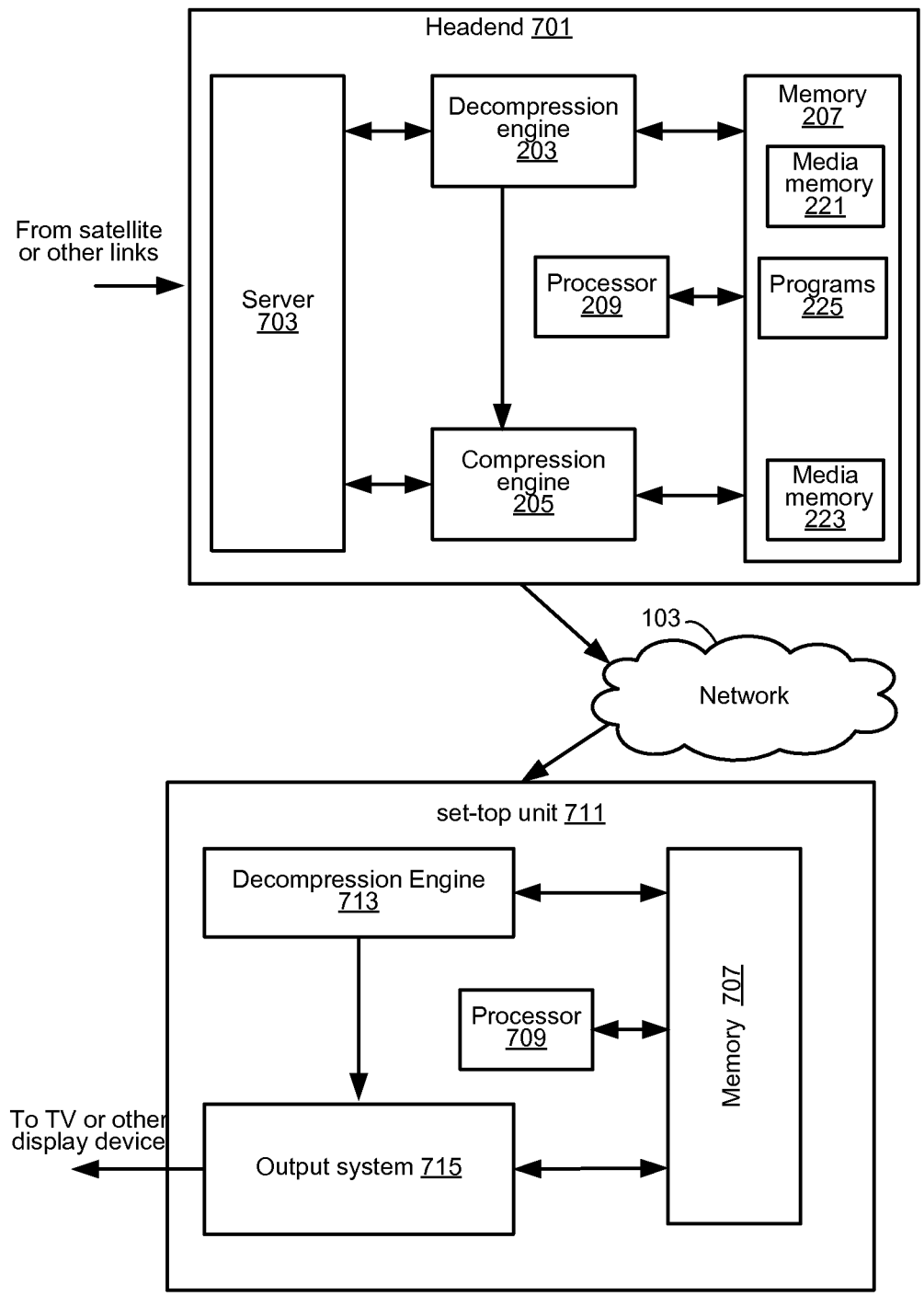
FIG. 7 is a simplified block diagram illustrating an embodiment of data flow from a headend 701 to a set-top unit 705. The transcoder operates according to one or more embodiments of the present invention.

FIG. 7 is a simplified block diagram illustrating an embodiment of data flow from a headend 701 to a set-top unit 705. The headend is operational to receive programs, e.g., from satellite and other links, and further includes at least one server 703 operational to store programs and to provide video, audio, and textual data to client devices such as the set-top unit 705. In this embodiment, the headend 701 includes the elements of the transcoder, including elements similar to the transcoder 200 of FIG. 2. In one embodiment, the headend 701 transcodes a video stream from a first to a second video compression format. In this embodiment, the transcoding architecture for the headend 701 is similar to the architecture of the transcoder 200 described above. For that reason, elements that function in a similar manner are given like reference numerals. In one embodiment, the headend 701 includes a decompression engine 203, memory 207, compression engine 205 and storage device in the server 703. For example, the headend 701 is operational to transcode an MPEG-2 video stream into an H.264 video stream. The headend 701 can transmits the H.264 video stream to the set-top unit 711 via a network 103.

The set-top unit 711 includes a processor 707, a memory 707, a decompression engine 713 and an output system 715, and is operational to receive the H.264 stream(s) from the headend. The decompression engine 713 is operational to decode the compressed H.264 video stream and to output the decompressed H.264 video stream to the output system 715. The output system 715 can generate digitized pictures and respective audio associated with the decompressed H.264 video stream and outputs the pictures and respective audio to, for example, a television or other display device, or a consumer media playback device.

Figure 8:
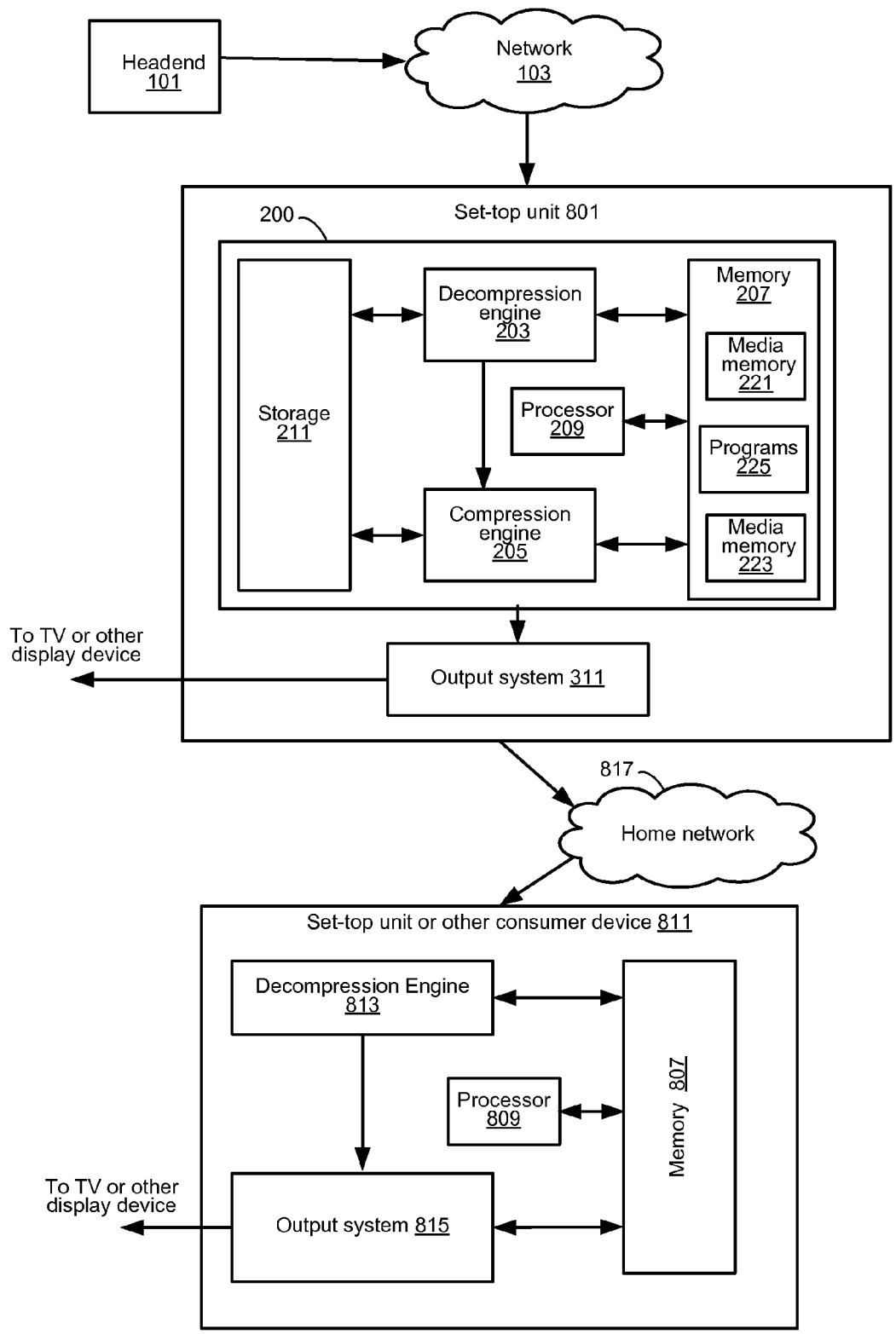
FIG. 8 is a block diagram illustrating an embodiment of data flow in a home network via which a main set-top unit and one or more other set-top units or consumer devices are coupled, and in which an embodiment of a the present invention can operate.

FIG. 8 is a block diagram illustrating an embodiment of data flow in a home network 817 via which a main set-top unit 801 and one or more other set-top units or consumer devices are coupled. One such other set-top unit 811 is shown in FIG. 8. The set-top unit 801 receives a video stream in a first video compression format, e.g., MPEG-2 from a headend 101 via a distribution network 103. The set-top unit 805 includes the elements of the transcoder 200 of FIG. 2, and is operative to transcode the video stream from the first video compression format into a second video compression format, e.g., H.264. The headend 101 can authorize video conversion from the first to a second video compression format in the set-top unit 801 for a particular user purpose. For example, the set-top unit 805 can be authorized to perform video format conversion for recording, a video program in a hard disk drive, such as the storage device 211, or in a consumer playback device. Additionally or alternatively, the authorization can be for the purpose of archival (that is, long term storage of a video program in the storage device).

In one home network embodiment, the video format conversion authorization can be for the purpose of transmitting one or more video programs from the first set-top unit 805 to a second set-top unit 811 via a user's home network 817. In the example shown, the set-top unit 811 includes a processor 809, a memory 807, a decompression engine 813 and an output system 815, and is operational to receive the H.264 stream(s) from other elements in the home network, such as the first set-top unit. The decompression engine 813 is operational to decode the compressed H.264 video stream and to output the decompressed video to the output system 815. The output system 815 can generate pictures and respective audio associated with the decompressed H.264 video stream and outputs the pictures and respective audio to, for example, a television or other display device, or a consumer media playback device.

In one implementation, the one or more processors of the set-top unit 105 includes a digital signal processor 309 coupled to the tuner system 305 and to the processing system via the bus system 317. The digital signal processor 309 is configured to process video programs received via communication interface 303 or communication port 313. In one implementation, the digital signal processor 309 is configured to carry out one or more of demodulation, forward error correction, and transport stream demultiplexing for received video streams. In one implementation, the digital signal processor 309 is also configured to carry out parsing to extract data that is specific to the transport stream level or intended to be extracted during transport stream processing. In one implementation, the digital signal processor 309 further is configured to carry out filtering in or filtering out specific transport stream data or specific video program data. For example, filtering capabilities could serve to extract or assist in the extraction of data that is specific to the transport stream, a packetized elementary stream, an elementary stream, or a video program.

The set-top unit 105 also includes a decompression engine 203 coupled to the processing system via the bus system 317 and configured to decompress compressed video, and a compression engine 205 also coupled to the bus system 317 and configured to compress video. The decompression engine 203 also is coupled to and configured to accept compressed video from the digital signal processor 309. The compression engine also is coupled to and configured to accept information from the decompression engine 203.

The set-top unit has via interrupt and messaging capabilities that, for example, enable the digital signal processor 309 to communicate with the processor 209, the storage device 211, so that video, audio, and data streams corresponding to a video program that are output by the digital signal processor 309 can be stored in the storage device 211, or can be provided to decompression engine 203, where they can be decompressed and processed prior to being output to the display device 107 of FIG. 1. In one embodiment, the streams that are output by the digital signal processor 309 are stored in storage device 211 and simultaneously provided to decompression engine 203, where they are decompressed and processed prior to being output to the display device 107.

One embodiment includes an analog video decoder 307 that is coupled to the digital signal processor 309 operative to accept analog TV signals therefrom corresponding to a video program and convert the analog signals into a sequence of digitized pictures, and further to convert the analog audio to corresponding digital audio. In such an embodiment, the analog video decoder 307 is coupled to the compression engine 205 that is operative to accept the digitized information from the video decoder 307. Simultaneously, the digitized pictures and respective audio may be also output to television 107 via the output system 311. In such an embodiment, the digitized pictures and respective audio are output by the analog video decoder 307 in sequential display order.

The compression engine 205 is operative to compress video and audio information and multiplex the compressed information into a transport stream. One embodiment is operative to store the compressed transport stream(s) in the storage device 211, e.g., by orchestrating sequential data transfers for the progressive data chunks of the video program's streams as they are being output by compression engine 205.

The decompression engine 203 in the set-top unit 105 includes one of more subsystems or capabilities for video decompression and audio decompression. It also includes capabilities for processing data corresponding to the video program being decompressed. For example, the close caption data of a video program corresponding is typically received as picture user data (also known as user data) in the input video stream and processed.

Other configurations and uses also are possible, as would be cleat to one in the art.

Thus a method and apparatus for conversion from a first video compression format to a second video compression format has been described.

Unless specifically stated otherwise, as apparent from the following discussions, it is appreciated that throughout the specification discussions utilizing terms such as "processing," "computing," "calculating," "determining" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

Note that when a method is described that includes several elements, e.g., several steps, no ordering of such elements, e.g., of such steps is implied, unless specifically stated.

In alternative embodiments, the one or more processors operate as a standalone device or may be connected, e.g., networked to other processor(s), in a networked deployment, the one or more processors may operate in the capacity of a server or a client machine in server-client network environment, or as a peer machine in a peer-to-peer or distributed network environment. The one or more processors may form a personal computer (PC), a tablet PC, a set-top unit (STB, also referred herein as a STT), a Personal Digital Assistant (PDA), a cellular telephone, a web appliance, a network router, switch or bridge, or any machine capable of executing a set of instructions (sequential or otherwise) that specify actions to be taken by that machine.

Note that while some diagram(s) only show(s) a single processor and a single memory that carries the logic including instructions, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer-readable medium encoding a set of instructions, e.g., a computer program that is for execution on one or more processors, e.g., one or more processors that are part of a transcoder, e.g., that is part of a set-top unit. Thus, as will be appreciated by those skilled in the art, embodiments of the present invention may be embodied as a method, an apparatus such as a special purpose apparatus, an apparatus such as a data processing system, or a computer-readable medium, e.g., a computer program product. The computer-readable medium has encoded thereon logic including a set of instructions that when executed on one or more processors cause the processor or processors to implement a method. Accordingly, aspects of the present invention may take the form of a method, an entirely hardware embodiment, an entirely software embodiment or an embodiment combining software and hardware aspects. Furthermore, the present invention may take the form of medium (e.g., a computer program product on a computer-readable storage medium) carrying computer-readable program code embodied in the medium.

It will be understood that the steps of methods discussed are performed in one embodiment by an appropriate processor (or processors) of a processing (i.e., computer) system executing instructions stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

It is noted that "picture" is used throughout this specification as one from a sequence of pictures that constitutes video, or digital video, in one of a plurality of forms. Furthermore, throughout this specification the terms "compression format" and "video compression format" have the same meaning when expressed in relation to video. Throughout the specification, video programs and video content are interchangeable, and should be understood to include television programs, movies, or video signals such as those provided by a personal video camera, videoconferencing camera, or other sources. Such video programs include compressed data streams corresponding to an ensemble of one or more sequence of elements that include video, audio, and/or other data, possibly with the provisions for synchronization of the sequence of elements. For video, the sequence of elements is a sequence of pictures. For audio, the sequence of elements typically corresponds to a sequence of audio frames. Other data can be data associated with the video program such as close captions. Of course, unless explicitly stated, audio need not be included.

The description herein describes auxiliary information in the form of one or more auxiliary data elements, e.g., parameters. One or more of the auxiliary data elements that correspond to a picture may be obtained or derived from the information in its "first video compression format" version. Alternatively, one or more of the auxiliary data elements may be derived or obtained from the information in the decompressed version of the picture. Furthermore, one or more of the auxiliary data elements that correspond to a picture may not be picture specific but pertain to a group of pictures or to the entire compressed video stream or video program. Hence, some auxiliary data elements may be shared among a plurality of pictures. For instance, bit-rate, information pertaining to specific bit-rate fluctuations, or whether the video stream in the first video compression format was encoded at "constant bit-rate" or "variable bit-rate," may be auxiliary data elements associated with a group of pictures.

In an alternate embodiment, compression engine 205 also uses as guidance at least a portion of the auxiliary data elements that correspond to a picture different than the current picture.

A feature of one embodiment of the decompression engine 203 is that is can be enabled to operate in one of two decompression operating modes, or in both. In a first decompression operating mode, the decompression engine 203 performs typical video decompression of the input video stream according to the syntax and semantic of the first video compression format and outputs the corresponding decompressed and reconstructed sequence of pictures. The second decompression operating mode corresponds to a conversion of compressed video from the first to the second video compression format. In the second decompression operating mode, the decompression engine 203 outputs one or more auxiliary data elements in addition to performing the first decompression operating mode.

It should further be appreciated that although the invention has been described in the context of the first format being MPEG-2 and the second format being H.264, the invention is not limited to such contexts and may be utilized in various other applications and systems, for example in a system that uses one of MPEG-2, MPEG-1, H.261, or H.263 as the first compression format, and one of VC-1, H.264, or the Chinese AVS as the second compression format. Furthermore, the invention is not limited to any one type of network architecture and method of encapsulation, and thus may be utilized in conjunction with one or a combination of other network architectures/protocols.

All publications, patents, and patent applications cited herein are hereby incorporated by reference.

Any discussion of prior art in this specification should in no way be considered an admission that such prior art is widely known, is publicly known, or forms part of the general knowledge in the field.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

What is claimed is:

1. A method of converting video information from a first compression format to a second compression format, the method comprising:

receiving data for a sequence of pictures in the first compression format, the received data including a video stream corresponding to a video program and including, for a picture that is inter coded, motion vectors and quantized transform coefficients of residuals of motion compensated inter-coded blocks;
extracting auxiliary information including one or more auxiliary data elements from the received data; and
transcoding from the first compression format to the second compression format, including carrying out motion estimation for blocks of image data in the second compression format, wherein carrying out the motion estimation for the blocks of image data in the second format comprises using the auxiliary information to ascertain to use one of the following: a first motion estimation method used for motion estimation in the first compression format and a second motion estimation method different from the first motion estimation method, wherein extracting the auxiliary information comprises extracting an indication of an energy level for each of a plurality of quadrants of residual information, and wherein ascertaining comprises:
comparing DC coefficients of the energy level for each of the plurality of quadrants with a first threshold defined for a DC component, comparing a sum of amplitude of AC coefficients of the energy level for each of the plurality of quadrants with a second threshold defined for an AC component,
ascertaining that the motion estimation in the first compression format is sufficient for the motion estimation in the second compression format when a quadrant of the plurality of quadrants has both the DC coefficients less than the first threshold and the sum of amplitude of AC coefficients less than the second threshold for the quadrant.

2. A method as recited in claim 1, wherein the auxiliary information further includes a quantization level used to quantize the transform coefficients in the first compression format.

3. A method as recited in claim 1, wherein ascertaining further comprises using the auxiliary information to determine the block size for motion estimation for the second compression format.

4. A method as recited in claim 1, further comprising receiving additional auxiliary information, and wherein the ascertaining further comprises ascertaining using the additional auxiliary information.

5. A method as recited in claim 4, wherein the additional auxiliary information is received as part of the video stream.

6. A method as recited in claim 4, wherein the additional auxiliary information is received as separate from the video stream.

7. A method as recited in claim 6, wherein the additional auxiliary information is received as part of a program guide for the video program.

8. A method as recited in claim 4, wherein the additional auxiliary information is the type of video program from a preselected set of program types.

9. A method as recited in claim 1, wherein the first threshold and the second threshold are a function of the program type.

10. A method as recited in claim 4, wherein the additional auxiliary information includes authorization for one or more actions that include the transcoding.

11. A method as recited in claim 1, wherein the first format is MPEG-2 and the second compression format is H.264.

12. A method as recited in claim 1, wherein the auxiliary information comprises one or more parameters, including, for a predictively inter coded macroblock, one or more motion vectors in the first compression format, wherein the second compression format uses the motion estimation that can be more accurate than the motion estimation used in first compression format, and wherein a first motion estimation method includes using the one or more motion vectors provided in the first compression format.

13. A method as recited in claim 12, wherein a predictively inter coded macroblock in the first compression format comprises four quadrants of residual information, wherein the one or more parameters of the auxiliary information for a predictively inter coded macroblock comprises an indication of the energy level in each of the four quadrants, wherein the ascertaining further comprises ascertaining how evenly the energy level of the residual information is distributed amongst the four quadrants.

14. A method as recited in claim 13, wherein the ascertaining of how evenly the energy of the residual information is distributed comprises comparing an indication of the residual energy in each of the four quadrants to the first threshold and the second threshold, and wherein ascertaining further comprises using the auxiliary information to determine the block size for the motion estimation for the second compression format.

15. A method as recited in claim 14, wherein the block size is determined by the number of quadrants whose indication of the residual energy is greater than the first threshold.

16. A method as recited in claim 14, wherein determining the block size includes determining if to use a block size smaller than the size of the quadrant.

17. A method as recited in claim 14, wherein determining if to use a block size smaller than the size of a quadrant includes determining how the residual energy is distributed within the quadrant.

18. A method as recited in claim 14, wherein the indication of the residual energy in each the four quadrants is provided by the quantized coefficients of the block corresponding to the quadrant in the first compression format.

19. Logic encoded in one or more non-transitory computer-readable media for execution and when executed operable to carry out a method of converting video information from a first compression format to a second compression format, the method comprising:
receiving data for a sequence of pictures in the first compression format, the received data including a video stream corresponding to a video program and including, for a picture that is inter coded, motion vectors and quantized transform coefficients of residuals of motion compensated inter-coded blocks;
extracting auxiliary information including one or more auxiliary data elements from the received data, wherein extracting the auxiliary information comprises extracting an indication of an energy level for each of a plurality of quadrants of residual information; and
transcoding from the first compression format to the second compression format, including carrying out motion estimation for blocks of image data in the second compression format, wherein carrying out the motion estimation for the blocks of image data in the second format comprises using the auxiliary information to ascertain whether to use one of the following: a first motion estimation method used for motion estimation in the first compression format and a second motion estimation method different from the first motion estimation method, wherein ascertaining comprises:
comparing DC coefficients of the enemy level for each of the plurality of quadrants with a first threshold defined for a DC component, comparing a sum of amplitude of AC coefficients of the enemy level for each of the plurality of quadrants with a second threshold defined for an AC component, and ascertaining that the motion estimation in the first compression format is sufficient for the motion estimation in the second compression format when a quadrant of the plurality of quadrants has both the DC coefficients less than the first threshold and the sum of amplitude of AC coefficients less than the second threshold for the quadrant.

20. A system comprising:

a memory storage; and a processing unit coupled to the memory storage, wherein the processing unit is operative to:

receive data for a sequence of pictures in the first compression format, the received data including a video stream corresponding to a video program and including for a picture that is inter coded motion vectors and quantized transform coefficients of residuals of motion compensated inter-coded blocks;

extract auxiliary information including one or more auxiliary data elements from the received data; and transcode from the first compression format to the second compression format, including carrying out motion estimation for blocks of image data in the second compression format, wherein the processing unit being operative to carry out the motion estimation for blocks of image data in the second format comprises the processing unit being operative to use the auxiliary information to ascertain to use one of the following: a first motion estimation method used for motion estimation in the first compression format and a second motion estimation method different from the first motion estimation method, wherein the processing unit being operative to extract the auxiliary information comprises the processing unit being operative to extract an indication of an energy level for each of a plurality of quadrants of residual information, and wherein the processing unit being operative to ascertain comprises the processing unit being operative to:

compare DC coefficients of the energy level for each of the plurality of quadrants with a first threshold defined for a DC component, compare a sum of amplitude of AC coefficients of the energy level for each of the plurality of quadrants with a second threshold defined for an AC component, and ascertain that the motion estimation in the first compression format is sufficient for the motion estimation in the second compression format when a quadrant of the plurality of quadrants has both the DC coefficients less than the first threshold and the sum of amplitude of AC coefficients less than the second threshold for the quadrant.

\* \* \* \* \*